(12) United States Patent
Park

(10) Patent No.: US 10,609,709 B2
(45) Date of Patent: *Mar. 31, 2020

(54) METHOD AND APPARATUS OF UPLINK SCHEDULING AND HARQ TIMING

(71) Applicant: Innovative Technology Lab Co., Ltd., Seoul (KR)

(72) Inventor: Dong Hyun Park, Seoul (KR)

(73) Assignee: Innovative Technology Lab Co., Ltd., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/163,101

(22) Filed: Oct. 17, 2018

(65) Prior Publication Data

US 2019/0053232 A1 Feb. 14, 2019

Related U.S. Application Data

(63) Continuation of application No. 15/439,058, filed on Feb. 22, 2017, now Pat. No. 10,111,223, which is a
(Continued)

(51) Int. Cl.
*H04W 72/04* (2009.01)
*H04L 5/00* (2006.01)
(Continued)

(52) U.S. Cl.
CPC ......... *H04W 72/0446* (2013.01); *H04J 11/00* (2013.01); *H04L 1/1812* (2013.01);
(Continued)

(58) Field of Classification Search
CPC ............. H04W 72/0446; H04W 72/14; H04W 72/0453; H04W 72/042; H04W 72/0413;
(Continued)

(56) References Cited

U.S. PATENT DOCUMENTS 8,737,289 B2 5/2014 Seo et al.
8,811,332 B2 8/2014 Yin et al.
(Continued)

FOREIGN PATENT DOCUMENTS

WO 2012/124996 9/2012
WO 2012/128558 9/2012
WO 2013/066072 5/2013

OTHER PUBLICATIONS

"3rd Generation Partnership Project; Technical Specification Group Radio Access Network; Evolved Universal Terrestrial Radio Access (E-UTRA); Physical layer procedures (Release 11)," 3GPP TS 36.213 V11.4.0, Sep. 2013, pp. 1-182, 3GPP Organizational Partners.
(Continued)

*Primary Examiner* — Rasheed Gidado

(57) ABSTRACT

The present disclosure relates to an apparatus and method for controlling an uplink (UL) scheduling and Hybrid Automatic Repeat reQuest (HARQ) timing supported in a TDD-FDD CA environment. The method includes receiving, on a first serving cell, at least one of a first UL grant and a first Physical HARQ Indicator Channel (PHICH) about a second serving cell through a cross-carrier scheduling, and receiving, on the second serving cell, at least one of a second UL grant and a second PHICH about the second serving cell through a self scheduling. According to aspects of the present invention, in a TDD-FDD carrier aggregation deployment environment, an efficient UL scheduling/HARQ operation may be performed for a UE in which a cross-carrier scheduling is configured. Further, in order to satisfy high data rate required by a UE, data transmission efficiency may be enhanced in accordance with the purpose of carrier aggregation (or dual connectivity).

16 Claims, 14 Drawing Sheets

Related U.S. Application Data continuation of application No. 15/085,504, filed on Mar. 30, 2016, now Pat. No. 9,614,647, which is a continuation of application No. 14/498,697, filed on Sep. 26, 2014, now Pat. No. 9,331,820.

(51) Int. Cl.

| | | |
|---|---|---|
| *H04L 1/18* | (2006.01) | |
| *H04W 72/14* | (2009.01) | |
| *H04W 72/12* | (2009.01) | |
| *H04L 5/14* | (2006.01) | |
| *H04J 11/00* | (2006.01) | |
| *H04B 7/26* | (2006.01) | |
| *H04W 88/02* | (2009.01) | |
| *H04W 88/08* | (2009.01) | |

(52) U.S. Cl.
CPC .......... *H04L 1/1861* (2013.01); *H04L 1/1887* (2013.01); *H04L 5/001* (2013.01); *H04L 5/0053* (2013.01); *H04L 5/0055* (2013.01); *H04L 5/0094* (2013.01); *H04L 5/14* (2013.01); *H04W 72/042* (2013.01); *H04W 72/0413* (2013.01); *H04W 72/0453* (2013.01); *H04W 72/12* (2013.01); *H04W 72/14* (2013.01); *H04B 7/2656* (2013.01); *H04W 88/02* (2013.01); *H04W 88/08* (2013.01)

(58) Field of Classification Search
CPC ... H04L 1/1812; H04L 1/1861; H04L 1/1671; H04L 1/1887; H04L 5/14; H04L 5/0055; H04L 5/0053; H04L 5/001; H04L 5/0094; H04L 5/0051
See application file for complete search history.

(56) References Cited

U.S. PATENT DOCUMENTS

| | | |
|---|---|---|
| 8,891,402 B2 | 11/2014 | Yin et al. |
| 9,042,277 B2 | 5/2015 | Chen et al. |
| 9,060,357 B2 | 6/2015 | Ji et al. |
| 9,154,275 B2 | 10/2015 | Moon et al. |
| 9,191,180 B2 | 11/2015 | Seo et al. |
| 9,258,086 B2 | 2/2016 | Chen et al. |
| 9,386,602 B2 | 7/2016 | Wang et al. |
| 2012/0257552 A1 | 10/2012 | Chen et al. |
| 2013/0034028 A1 | 2/2013 | Chen et al. |
| 2014/0003303 A1* | 1/2014 | Yang ............... H04L 1/1867 370/280 |
| 2014/0029484 A1* | 1/2014 | Choi ............... H04J 3/1694 370/280 |
| 2014/0119246 A1* | 5/2014 | Yin ............... H04W 72/12 370/280 |
| 2014/0293893 A1* | 10/2014 | Papasakellariou .... H04W 72/04 370/329 |
| 2015/0085713 A1* | 3/2015 | He ............... H04W 76/38 370/280 |

OTHER PUBLICATIONS

International Search Report for International Patent Application No. PCT/KR2014/009040, dated Jan. 2, 2015.
Written Opinion for International Patent Application No. PCT/KR2014/009040, dated Jan. 2, 2015.
"HARQ and scheduling timing for TDD-FDD CA", 3GPP TSG RAN WG1 Meeting #75, ITL Inc., Nov. 11-15, 2013, pp. 1-5.
"3rd Generation Partnership Project; Technical Specification Group Radio Access Network; Evolved Universal Terrestrial Radio Access (E-UTRA); Physical layer procedures (Release 10)," 3GPP TS 36.213 V10.10.0, Jun. 2013, pp. 1-127, 3GPP Organizational Partners.

\* cited by examiner (a) CA of TDD & FDD (b) CA of TDD & FDD DL (c) CA of TDD DL & FDD

METHOD AND APPARATUS OF UPLINK SCHEDULING AND HARQ TIMING

CROSS-REFERENCE TO RELATED APPLICATIONS

This application is a continuation of U.S. patent application Ser. No. 15/439,058, filed on Feb. 22, 2017, which is a continuation of U.S. patent application Ser. No. 15/085,504, filed on Mar. 30, 2016, which is a continuation of U.S. patent application Ser. No. 14/498,697, filed on Sep. 26, 2014, and claims priority from and the benefit of Korean Patent Application No. 10-2013-0115659, filed on Sep. 27, 2013, each of which is hereby incorporated by reference in its entirety.

BACKGROUND

1. Field

The present disclosure relates to a wireless communication and, more particularly, to a method and apparatus for controlling uplink (UL) scheduling and Hybrid Automatic Repeat reQuest (HARQ) timing capable of being supported in a next generation Long Term Evolution (LTE) system.

2. Discussion of the Background

Automatic repeat request (ARQ) is one of the schemes that enhance reliability of a wireless communication. The ARQ refers to a scheme in which a transmitter retransmits a data signal if a data signal reception is failed at a receiver. Further, there is a scheme, hybrid automatic repeat request (HARQ), which is a combination of Forward Error Correction (FEC) and ARQ. A receiver that utilizes HARQ generally attempts an error correction for a received data signal and determines whether a retransmission needs to be performed by using an error detection code. As the error detection code, Cyclic Redundancy Check (CRC) scheme may be used. If data signal error is not detected from the detection process of CRC scheme, the receiver determines that a decoding process for the data signal is successful. In this case, the receiver transmits an Acknowledgement (ACK) signal to a transmitter. If data signal error is detected from the detection process of CRC scheme, the receiver determines that a decoding process for the data signal is not successful. In this case, the receiver transmits a Not-Acknowledgement (NACK) signal to a transmitter. If the transmitter receives the NACK signal, the transmitter may retransmit the data signal.

A wireless communication system may support Frequency Division Duplex (FDD) scheme and Time Division Duplex (TDD) scheme. In the FDD scheme, an uplink transmission and a downlink transmission may be simultaneously performed in a cell because a carrier frequency for an uplink (UL) transmission is different from a carrier frequency for a downlink (DL) transmission exists. In the TDD scheme, with respect to one cell, an uplink transmission and a downlink transmission are distinguished from each other based on different time slots. In the TDD scheme, a base station and a user equipment perform switching operations between a transmission mode and a reception mode because the same carrier is used for both an uplink transmission and a downlink transmission. In the TDD scheme, a Special Subframe may be added to provide a guard time for switching between the transmission mode and the reception mode. The Special Subframe may include Downlink Pilot Time Slot (DwPTS), Guard Period (GP), and Uplink Pilot Time Slot (UpPTS). According to the TDD scheme, resource amounts for the uplink transmission and resource amounts for the downlink transmission may be asymmetrically assigned through various uplink (UL)-downlink (DL) configurations.

Currently, remaining frequency resources are scarce and various technologies have been utilized in wide frequency bands because of the frequency resource scarcity. For this reason, in order to provide a wideband bandwidth for supporting higher data-rate requirements, each of scattered bands has been configured to satisfy basic requirements to operate an independent system and a carrier aggregation (CA) scheme, which aggregates various frequency bands into one system, has been adopted. Here, each frequency band or carrier capable of an independent operation may be defined as a component carrier (CC). According to the adoption of the carrier aggregation system, ACK/NACK signals corresponding to a plurality of component carriers (CCs) need to be transmitted.

Recently, there is a need for a TDD-FDD CA scheme that aggregates an FDD band (or carrier) with a TDD band (or carrier). In order to perform a TDD-FDD joint operation in accordance with the TDD-FDD CA scheme, a new concept for an uplink scheduling and HARQ timing needs to be introduced. Specifically, in a case where a cross-carrier scheduling between a TDD carrier and a FDD carrier is configured for a user equipment, there is a problem that a plurality of uplink resources of a scheduled cell that is scheduled by a scheduling cell are in idle states without being utilized. To address such problem occurring when TDD-FDD are jointly configured, there is a need for a method for configuring an appropriate and efficient uplink scheduling and HARQ timing with respect to the timing of data signal transmission/reception and the timing of HARQ ACK/NACK signal transmission/reception.

SUMMARY

In accordance with an aspect of the present invention, an object is to provide a method and apparatus for an uplink scheduling.

In accordance with an aspect of the present invention, an object is to provide a method and apparatus for an uplink HARQ timing.

In accordance with an aspect of the present invention, an object is to provide a method and apparatus for an uplink scheduling and HARQ for a user equipment in which both a TDD serving cell and an FDD serving cell are configured.

In accordance with an aspect of the present invention, another object is to provide a method and apparatus for an uplink scheduling and HARQ in a system that supports a carrier aggregation (CA) or a dual connectivity.

According to an exemplary embodiment of the present invention, there is provided a method for supporting an uplink (UL) hybrid automatic repeat request (HARQ) by a user equipment in a wireless communication system that supports a cross-carrier scheduling and a carrier aggregation (CA) of a first serving cell, which is a TDD based serving cell, and a second serving cell, which is a FDD based serving cell. The method for supporting UL HARQ by a user equipment includes receiving at least one of a first Physical Hybrid automatic repeat request Indicator Channel (PHICH) and a first UL grant for the second serving cell through a cross-carrier scheduling on the first serving cell, and receiving at least one of a second PHICH and a second UL grant for the second serving cell through a self-scheduling on the second serving cell.

According to an exemplary embodiment of the present invention, there is provided a method for supporting a UL HARQ by a base station in a wireless communication system that supports a cross-carrier scheduling and a carrier aggregation of a first serving cell, which is a TDD based serving cell, and a second serving cell, which is a FDD based serving cell. The method for supporting UL HARQ by a base station includes transmitting, to a user equipment (UE), carrier aggregation configuration information that indicates an aggregation of the TDD-based first serving cell and the FDD-based second serving cell, transmitting, to the UE, at least one of a first PHICH and a first uplink (UL) grant for the second serving cell through a cross-carrier scheduling on the first serving cell, and transmitting at least one of a second PHICH and a second UL grant for the second serving cell through a self-scheduling on the second serving cell.

According to aspects of the present invention, a UL scheduling/HARQ operation may be efficiently performed for a UE in which a cross-carrier scheduling in an environment in which a TDD-FDD carrier aggregation (or a dual connectivity) is deployed, and a data transmission rate may be enhanced to satisfy high-data rate requirements for a UE in accordance with the purpose of a carrier aggregation (or a dual connectivity).

BRIEF DESCRIPTION OF THE DRAWINGS

FIG. 9 is a diagram illustrating an example of a UL scheduling/HARQ timing as a second exemplary embodiment of the present invention.

FIG. 10 is a diagram illustrating another example of a UL scheduling/HARQ timing as the second exemplary embodiment of the present invention.

DETAILED DESCRIPTION OF THE ILLUSTRATED EMBODIMENTS

Figure 1:
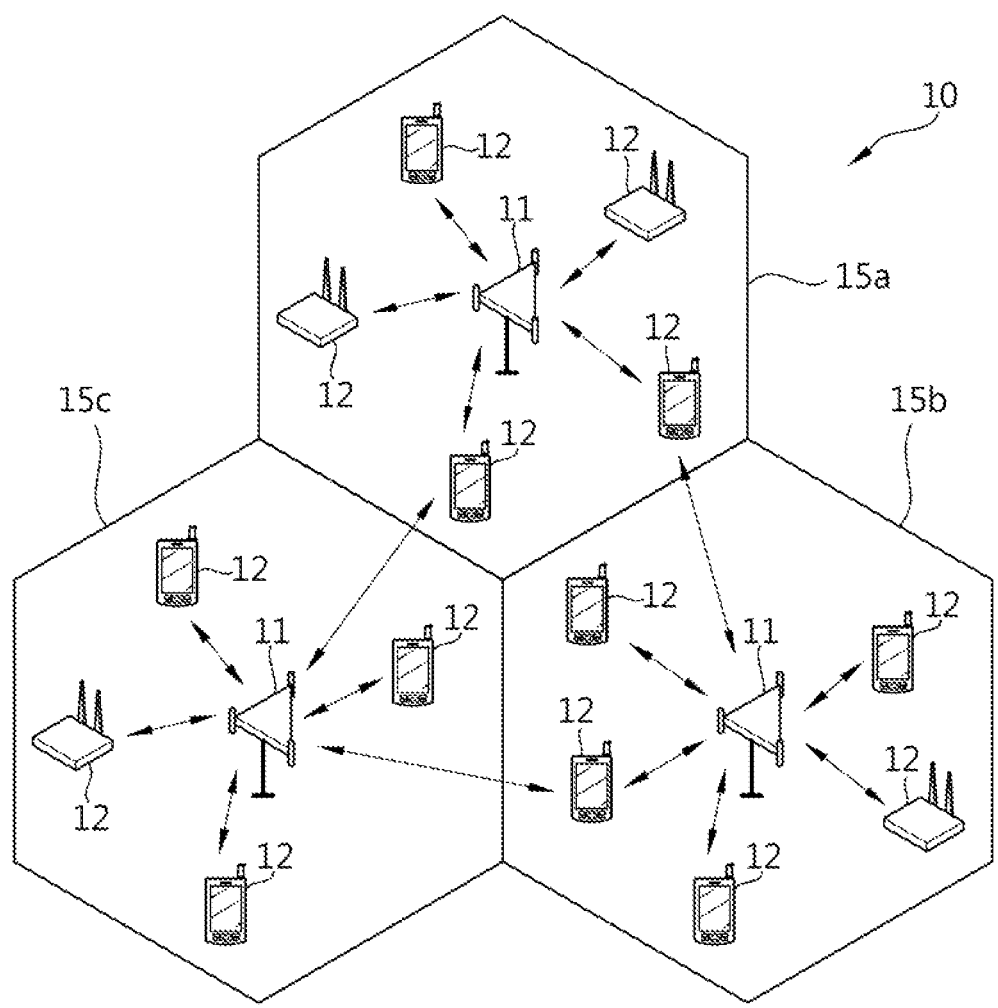
FIG. 1 is a diagram illustrating a wireless communication system according to an exemplary embodiment of the present invention.

Exemplary embodiments of the present invention will be described more fully hereinafter with reference to the accompanying drawings, in which exemplary embodiments of the invention are shown. Throughout the drawings and the detailed description, unless otherwise described, the same drawing reference numerals are understood to refer to the same elements, features, and structures. In describing the exemplary embodiments, detailed description on known configurations or functions may be omitted for clarity and conciseness.

Further, the terms, such as first, second, A, B, (a), (b), and the like may be used herein to describe elements in the description herein. The terms are used to distinguish one element from another element. Thus, the terms do not limit the element, an arrangement order, a sequence or the like. It will be understood that when an element is referred to as being "on", "connected to" or "coupled to" another element, it can be directly on, connected or coupled to the other element or intervening elements may be present. In contrast, when an element is referred to as being "directly on," "directly connected to" or "directly coupled to" another element, there are no intervening elements present.

Further, the description described herein is related to a wireless communication network, and an operation performed in a wireless communication network may be performed in a process of controlling a network and transmitting data by a system that controls a wireless network, e.g., a base station, or may be performed in a user equipment connected to the wireless communication network.

According to the exemplary embodiments of the present invention, transmitting controlled channel can be interpreted as control information being transmitted through certain channels. Here, a controlled channel can be either the PDCCH (Physical Downlink Control Channel) or the PUCCH (Physical Uplink Control Channel)

FIG. 1 is a diagram illustrating a wireless communication system according to an exemplary embodiment of the present invention.

According to FIG. 1, a wireless communication system 10 is widely deployed in order to provide diverse telecommunication services, such as voice and packet data. A wireless communication system includes at least one base station 11 (BS). Each BS 11 provides telecommunication service to certain cells 15*a*, 15*b*, and 15*c*. A cell may again be divided into multiple sectors.

User equipment 12 (mobile station, MS) may be located at a certain location or mobile, and may also be referred to as different terms, including UE (user equipment), MT (mobile terminal), UT (user terminal), SS (subscriber station), wireless device, PDA (personal digital assistant), wireless modem, and handheld device. A base station 11 may also be referred to as eNB (evolved-NodeB), BTS (Base Transceiver System), Access Point, femto base station, Home nodeB, and relay. A cell inclusively refers to various coverage areas, such as mega cell, macro cell, micro cell, pico cell, and femto cell.

Hereinafter, the term downlink refers to communication from a base station 11 to a UE 12, and the term uplink refers to communication from a UE 12 to a base station 11. For downlink, a transmitter may be part of a base station 11, and a receiver may be part of a UE 12. For uplink, a transmitter may be part of a UE 12 and a receiver may be part of a base station 11. There is no limitation in the multiple access method applied to a wireless communication system. Diverse methods can be used, including CDMA (Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA. Uplink transmission and downlink transmission can use either TDD (Time Division Duplex), which uses different time locations for transmissions, or FDD (Frequency Division Duplex), which uses different frequencies for transmissions.

Carrier Aggregation (CA), which is also referred to as spectrum aggregation or bandwidth aggregation, supports multiple carriers. Each individual unit carrier, which is aggregated by carrier aggregation, is referred to as Component Carrier (CC). Each component carrier is defined by bandwidth and center frequency. CA is introduced to support increasing throughput, to prevent cost increase due to the introduction of the wideband radio frequency and to ensure the compatibility with the existing system. For example, if five component carriers are allocated as granularity that has a carrier unit with 20 MHz bandwidth, it can support 100 MHz bandwidth at maximum.

CA can be divided as contiguous carrier aggregation, which is made among continuous CCs, and non-contiguous carrier aggregation, which is made among non-continuous CCs. The number of carriers aggregated between uplink and downlink can be configured differently. It is referred to as symmetric aggregation when there are equal number of downlink CCs and uplink CCs, and it is referred to as asymmetric aggregation when the number of downlink CCs and the number of uplink CCs are not equal.

The size of component carriers (in other words, bandwidth) can be different. For example, if five component carriers are used to form 70 MHz band, 5 MHz component carrier (carrier #0)+20 MHz component carrier (carrier #1)+20 MHz component carrier (carrier #2)+20 MHz component carrier (carrier #3)+5 MHz component carrier (carrier #4) can be aggregated together.

Hereinafter, a multiple carrier system includes the system that supports carrier aggregation. Contiguous CA and/or non-contiguous CA can be used in the multiple carrier system; in addition, both symmetric aggregation and asymmetric aggregation can be used in the multiple carrier system as well. A serving cell can be defined as a component frequency band based on multiple CC system which can be aggregated by CA. A serving cell may include a primary serving cell (PCell) and a secondary serving cell (SCell). A PCell means a serving cell which provides security input and Non-Access Stratum (NAS) mobility information on Radio Resource Control (RRC) establishment or re-establishment state. Depends on the capability of a user equipment, at least one cell can be used together with a PCell to form an aggregation of serving cells, the cell used with a PCell is referred to as an SCell. An aggregation of serving cells which configured for a user equipment may include one PCell, or one PCell together with at least one SCell.

Downlink component carrier corresponding to a PCell refers to Downlink (DL) Primary Component Carrier (PCC), and uplink component carrier corresponding to a PCell refers to Uplink (UL) PCC. In addition, downlink component carrier corresponding to a SCell refers to a DL Secondary Componenent Carrier (SCC), and an uplink component carrier corresponding to a SCell refers to a UL SCC. Only DL CC may correspond to a serving cell, or a DL CC and an UL CC together may correspond to a serving cell.

Figure 2:
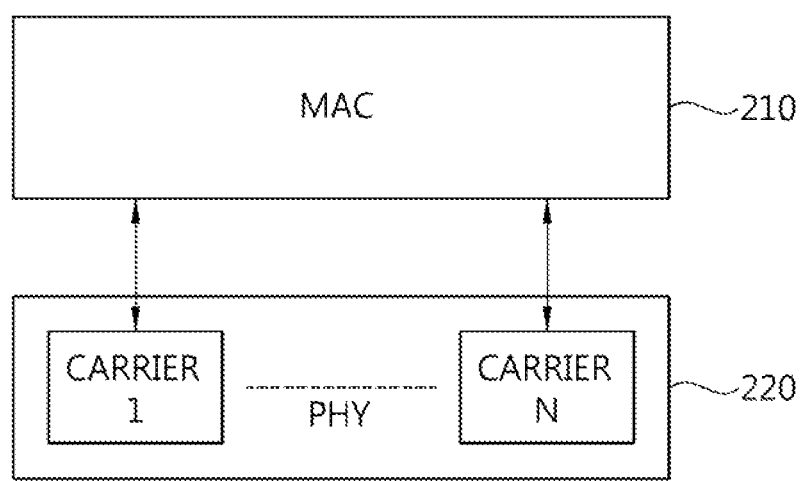
FIG. 2 is a diagram illustrating an example of a protocol structure for supporting a multi-carrier system according to an exemplary embodiment of the present invention.

FIG. 2 is a diagram illustrating an example of a protocol structure for supporting a multi-carrier system according to an exemplary embodiment of the present invention.

Referring to FIG. 2, common Medium Access Control (MAC) entity 210 manages physical layer 220 which uses a plurality of carriers. The MAC management message, transmitting through a certain carrier, may be applied to other carriers. That is, the MAC management message is a message which controls other carriers including the certain carrier mentioned above. A physical layer 220 may be operated by the Time Division Duplex (TDD) and/or the Frequency Division Duplex (FDD).

There are some physical control channels used in physical layer 220. A Physical Downlink Control Channel (PDCCH) informs to a UE with regard to resource allocation of a Paging Channel (PCH) and a Downlink Shared Channel (DL-SCH), and a Hybrid Automatic Repeat Request (HARD) information related to a DL-SCH. The PDCCH may carry uplink grant which informs a resource allocation of uplink transmission to a UE. A Physical Control Format Indicator Channel (PCFICH), which transmits every subframe, informs the number of OFDM symbols used on the PDCCHs to a user equipment. A Physical Hybrid ARQ Indicator Cannel (PHICH) carries the HARQ ACK/NACK signals as a response to uplink transmission. That is, the ACK/NACK signal with regard to uplink data transmitted from a UE is transmitted through the PHICH. A Physical Uplink Control Channel (PUCCH) can carry uplink controlling information such as the HARQ ACK/NACK, scheduling request or the CQI. The Physical Uplink Shared Channel (PUSCH) carries the Uplink Shared Channel (UL-SCH). Uplink data transmitting through the PUSCH can be a transport block which is a data block for the UL-SCH. The Physical Random Access Channel (PRACH) carries random access preamble.

A plurality of the PDCCH can be transmitted in the controlled region, and a user equipment can monitor a plurality of the PDCCH. The PDCCH is transmitted on either one Control Channel Element (CCE) or an aggregation of several consecutive CCEs. The CCE is a logical allocation unit used to provide PDCCH with a code rate based on the state of radio channel. The CCE corresponds to a plurality of Resource Element Groups. The format of the PDCCH and the number of available bits for the PDCCH are determined according to the relationship between the number of CCEs and a code rate provided by the CCEs.

Control information carried on the PDCCH is referred to as Downlink Control Information (DCI). The following table 1 shows DCI pursuant to several formats.

TABLE 1

| DCI Format | Description |
| --- | --- |
| 0 | Used for PUSCH scheduling in uplink cell |
| 1 | Used for one PDSCH codeword scheduling in one cell |
| 1A | Used for brief scheduling of one PDSCH codeword in one cell or random access process initialized by the PDCCH command |
| 1B | Used for a brief scheduling of one PDSCH codeword with precoding information in one cell |
| 1C | Used for one PDSCH codeword brief scheduling in one cell or the notification of MCCH change |
| 1D | Used for a brief scheduling of one PDSCH codeword in one cell including precoding or power offset information |
| 2 | Used for the PDSCH scheduling of the user equipment configured of spartial multiplexing mode. |
| 2A | Used for the PDSCH scheduling of the user equipment configured of large delay CDD mode |
| 2B | Used in the transmission mode 8 (a double layer transmission, etc) |
| 2C | Used in the transmission mode 9 (a multi layer transmission) |
| 2D | Used in the transmission mode 10 (CoMP) |
| 3 | Used for the tramission of TPC commands for PUCCH and PUSCH including 2-bit power adjustment |
| 3A | Used for the tramission of TPC commands for PUCCH and PUSCH including single-bit power adjustment |
| 4 | Used for the PUSCH scheduling in the uplink multi-antenna port transmission cell |

Referring to Table 1, There are DCI formats such as format 0 used for the PUSCH scheduling in uplink cell, format 1 used for one PDSCH codeword scheduling in one cell, format 1A used for compact scheduling of one PDSCH codeword, format 2 used for the PDSCH scheduling in closed-loop spartial multiplexing mode, format 2B used for the PDSCH scheduling in open-loop spartial multiplexing mode, format 2B used in the transmission mode 8, format 2C used in the transmission mode 9, format 2D used in the transmission mode 10, format 3 and 3A used for the uplink tramission of TPC commands for the PUCCH and the PUSCH, and format 4 used for the PUSCH scheduling in the uplink multi-antenna port transmission cell.

Each field of DCI is sequentially mapped to n number of information bits $a_0$ or $a_{n-1}$. For example, the DCI is mapped to a total length of 44 bits of information bits, each field of DCI is mapped sequentially to $a_0$ or $a_{43}$. DCI formats 0, 1A, 3, 3A may have the same payload size. DCI format 0, 4 may be referred to as the Uplink grant (UL grant).

Cross-carrier scheduling is a scheduling method capable of performing resource allocation of a PDSCH transmitted by using a different carrier through a PDCCH transmitted through a specific CC and/or resource allocation of a PUSCH transmitted by using another CC other than a CC basically linked to the specific CC. That is, the PDCCH and the PDSCH can be transmitted through different DL CCs, and the PUSCH can be transmitted through a UL CC other than a UL CC linked to a DL CC on which a PDCCH including a UL grant is transmitted.

During cross-carrier scheduling, a user equipment only receives scheduling information (such as UL grant) through a serving cell (or CC). Hereinafter, a serving sell (or CC) performing cross-carrier scheduling may refer to scheduling cell (or CC), and a serving cell being scheduled by scheduling cell may refer to scheduled cell (or CC). Scheduling cell may refer to ordering cell, and scheduled cell may refer to following serving cell.

As such, in a system supporting the cross-carrier scheduling, a carrier indicator is required to report a specific DL CC/UL CC used to transmit the PDSCH/PUSCH for which the PDCCH provides control information. A field including the carrier indicator is hereinafter called a carrier indication field (CIF). Hereinafter, configuration of CIF may mean that configuration of cross-carrier scheduling.

The aforementioned cross-carrier scheduling can be classified into the DL cross-carrier scheduling and UL cross-carrier scheduling. The DL cross-carrier scheduling implies a case where the CC for transmitting the PDCCH including resource allocation information for the PDSCH transmission and other information is different from a CC for transmitting the PDSCH. The UL cross-carrier scheduling implies a case where a CC for transmitting the PDCCH including a UL grant for the PUSCH transmission is different from the DL CC linked to the UL CC for transmitting the PUSCH.

Figure 3:
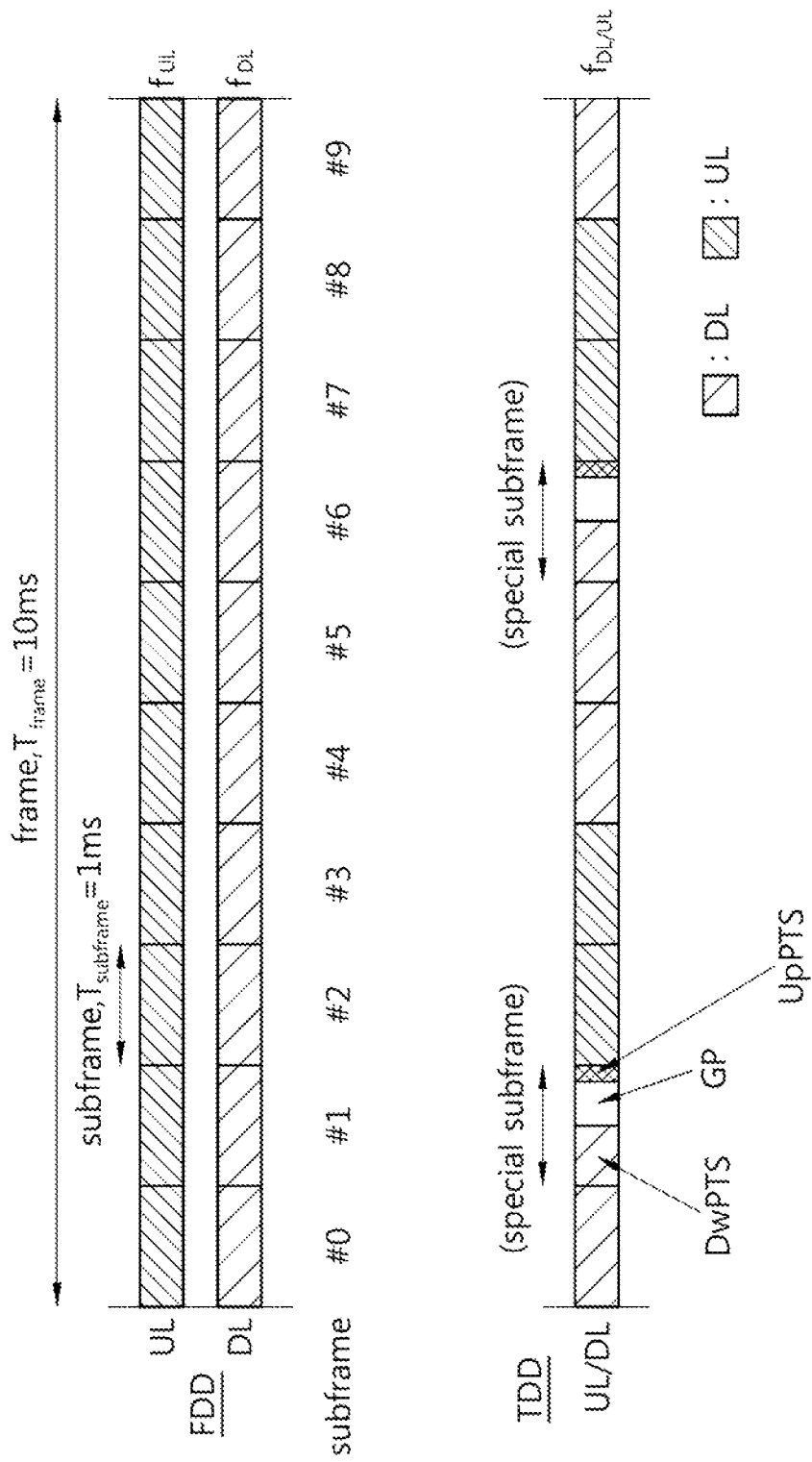
FIG. 3 is a diagram illustrating an example of a radio frame structure according to an exemplary embodiment of the present invention. The diagram illustrates a FDD radio frame structure and a TDD radio frame structure.

FIG. 3 is a diagram illustrating an example of a radio frame structure according to an exemplary embodiment of the present invention. The diagram illustrates a FDD radio frame structure and a TDD radio frame structure.

Referring to FIG. 3, one radio frame includes 10 subframes, and one subframe includes 2 consecutive slots.

In the FDD, both carrier used for UL transmission and carrier used for DL transmission exist, and UL transmission and DL transmission can be performed simultaneously in one cell.

In the TDD, on one cell basis, UL transmission and DL transmission can always distinguished in time. Because a same carrier is used for both UL transmission and DL transmission, a base station and user equipment repeatedly switches between the transmission mode and the reception mode. In the TDD, special subframe can be placed to provide a guard time which is for switching mode between the transmission and the reception. Special subframe, as shown, includes a downlink pilot time slot (DwPTS), a guard period (GP), and an uplink pilot time slot (UpPTS). The DwPTS is used in the UE for initial cell search, synchronization, or channel estimation. The UpPTS is used in the BS for channel estimation and uplink transmission synchronization of the UE. The GP is needed to avoid interference between an uplink and a downlink, and during the GP, no UL transmission and DL transmission occurs.

Table 2 shows an example of UL-DL configuration of radio frame. UL-DL configuration defines reserved subframe for UL transmission or reserved subframe for DL transmission. That is, UL-DL configuration informs the rules how the uplink and the downlink are allocated (or reserved) in every subframe of one radio frame.

TABLE 2

| Uplink-downlink configuration | Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2, 'D' denotes a DL subframe, 'U' denotes a UL subframe, and 'S' denotes a special subframe. As shown to Table 2, subframe 0 and 5 are always allocated to DL transmission, and subframe 2 is always allocated to UL-transmission. As shown to Table 2, each UL-DL configuration has a different number and position of DL subframe and UL subframe in one radio frame. Through diverse UL-DL configuration, the amount of resource allocated to UL/DL transmission can be given asymmetrically. To avoid severe interference between UL and DL among cells, neighboring cells generally have same UL-DL configuration.

The point changing from DL to UL or the point changing from UL to DL is referred to the switching point. The switch-point periodicity, which is either 5 ms or 10 ms, means a repeating period of the same chaining aspect between the UL subframe and DL subframe. For example, referring to the UL/DL configuration 0, subframe from 0 to 4 changes D→S→U→U→U, subframe from 5 to 9 changes, as same as before, D→S→U→U→U. Since one subframe is 1 ms, the switch-point periodicity is 5 ms. That is, the switch-point periodicity is shorter than the length of one radio fram (10 ms), the changing aspect in the radio frame is repeated for one time.

The UL-DL configuration in above Table 2 can be transmitted from a base station to a user equipment through system information. The base station can inform a UL-DL allocation status change in a radio frame to a UE by transmitting the index of the UL-DL configuration whenever the UL-DL configuration changes. Or the UL-DL configuration can be control information which is transmitted to every UE in the cell through broadcast channel.

Meanwhile, the Automatic Repeat Request (ARQ) is one of the schemes that enhance reliability of a wireless communication. The ARQ refers to a scheme in which a transmitter retransmits a data signal if a data signal reception is failed at a receiver. Further, there is a scheme, the hybrid automatic repeat request (HARQ), which is a combination of the Forward Error Correction (FEC) and the ARQ. A receiver that utilizes the HARQ generally attempts an error correction for a received data signal and determines whether a retransmission needs to be performed by using an error detection code. As the error detection code, Cyclic Redundancy Check (CRC) scheme may be used. If data signal error is not detected from the detection process of CRC scheme, the receiver determines that a decoding process for the data signal is successful. In this case, the receiver transmits an Acknowledgement (ACK) signal to a transmitter. If data signal error is detected from the detection process of CRC scheme, the receiver determines that a decoding process for the data signal is not successful. In this case, the receiver transmits a Not-Acknowledgement (NACK) signal to a transmitter. If the transmitter receives the NACK signal, the transmitter may retransmit the data signal.

The UL HARQ is a procedure where a based station transmits the PDCCH/EPDCCH to UE, the UE transmits the PUSCH data at a predetermined timing, and the base station is repeatedly transmitting the corresponding ACK/NACK through PHICH at a predetermined timing until when the UE receives the ACK signal from the base station. In LTE system, UL HARQ is referred to sychoronous UL HARQ transmitting data at a predetermined timing.

Under circumstances such as carrier aggregation, if FDD applies to every serving cell or, same TDD UL/DL configuration applies to serving cells, the PUSCH timing transmitting from PCell and the PUSCH timing transmitting from the SCell can be the same. However, if the TDD UL/DC configuration is different between at least two serving cells, the PUSCH transmission timing can be different.

First, the PUSCH transmission timing with regard to associated with the PHICH, that is, considering the PHICH as a reference point, transmission timing of the PUSCH for which the PHICH transmits ACK/NACK can be shown as below.

In the FDD, if PHICH is received to a user equipment in subframe i, related PUSCH transmission subframe is i−4.

In the TDD, when a single carrier is configured to a user equipment or same TDD UL/DL configuration is applied to every serving cell, and if TDD UL/DL configuration is 1 or 6, the PUSCH transmission timing related to the PHICH received to a UE in subframe i is subframe i−k. In this case, the value of k is given in Table 3 below.

TABLE 3

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | | 6 | | | | | 6 | |
| 3 | 6 | | | | | | | | 6 | 6 |
| 4 | | | | | | | | | 6 | 6 |
| 5 | | | | | | | | | 6 | |
| 6 | 6 | 4 | | | | 7 | 4 | | | 6 |

Table 3 is about the value of index k indicating the PUSCH timing considered in the TDD. Here, k indicates that, when a user equipment received the PHICH in subframe i, the PUSCH is transmitted in the subframe i−k, which is located k subframes before the subframe i in which the PHICH has transmitted. For example, if the TDD UL/DL configuration is 1, when a user equipment receives the PHICH in subframe #9 (i=9), the PHICH indicates that the PHICH is related to the PUSCH transmitted in subframe #3 (i−k=9−6=3). Meanwhile, when the TDD UL/DL configuration is 0, if the value of $I_{PHICH}$ received to a user equipment from subframe i is 0, the related PUSCH transmission timing is subframe i−k (refer to Table 3), and if the value of $I_{PHICH}$ is 1, the related PUSCH transmission timing is subframe i−6.

Meanwhile, in the TDD, if two or more serving cells are configured to a UE, and at least two serving cells have different UL-DL configurations, the PUSCH transmission timing is determined based on the UL-reference UL/DL configuration. Here, the UL-reference UL/DL configuration means a UL/DC configuration which became a basis for the UL HARQ timing in corresponding serving cell.

If two or more serving cells are configured to a user equipment, at least two serving cells have different UL-DL configurations, and the corresponding serving cell is PCell or a user equipment is not configured to monitor the PDCCH/EPDCCH in a different serving cell, the corresponding serving cell sets the UL-reference UL/DL configuration as its own UL/DL configuration.

If two or more serving cells are configured to a UE, at least two serving cells have different UL-DL configurations, the corresponding serving cell is SCell, and a UE is configured to monitor the PDCCH/EPDCCH in a different serving cell, the UL-reference UL/DL configuration for the corresponding serving cell can be shown as Table 4 below.

TABLE 4

| Set # | (other serving cell UL/DL configuration, serving cell UL/DL configuration) | UL-reference UL/DL configuration |
|---|---|---|
| Set 1 | (1,1), (1,2), (1,4), (1,5) | 1 |
|  | (2,2), (2,5) | 2 |
|  | (3,3), (3,4), (3,5) | 3 |
|  | (4,4), (4,5) | 4 |
|  | (5,5) | 5 |
| Set 2 | (1,0), (2,0), (3,0), (4,0), (5,0) | 0 |
|  | (2,1), (4,1), (5,1) | 1 |
|  | (5,2) | 2 |
|  | (4,3), (5,3) | 3 |
|  | (5,4) | 4 |
|  | (1,6), (2,6), (3,6), (4,6), (5,6) | 6 |
| Set 3 | (3,1) | 1 |
|  | (3,2), (4,2) | 2 |
|  | (1,3), (2,3) | 3 |
|  | (2,4) | 4 |
| Set 4 | (0,0), (6,0) | 0 |
|  | (0,1), (0,2), (0,4), (0,5), (6,1), (6,2), (6,5) | 1 |
|  | (0,3), (6,3) | 3 |
|  | (6,4) | 4 |
|  | (0,6), (6,6) | 6 |

In Table 4, based on the other serving cell UL/DL configuration and the serving cell UL/DL configuration, it indicates the UL-reference UL/DL (or UL-DL) configuration for the corresponding serving cell. For example, the UL-reference UL/DL configuration for the serving cell, if the other serving cell UL/DL configuration and the serving cell UL/DL configuration in Table 4 are belong to Set 1, the UL HARQ timing is applied based on the UL-reference UL/DL configuration for the Set 1.

As described above, if the UL-reference UL/DL configuration is 1 or 6, the PUSCH transmission timing related to the PHICH received to a user equipment in subframe i is subframe i−k. In this case, the value of k is given in Table 3, the "TDD UL/DL configuration" in Table 3 refers to the "UL-reference UL/DL configuration." Meanwhile, when the UL-reference UL/DL configuration in a serving cell is 0, if the value of $I_{PHICH}$ received to a user equipment in subframe i is 0, the related PUSCH transmission timing is subframe i−k (refer to Table 3), and if the value of $I_{PHICH}$ is 1, the related PUSCH transmission timing is subframe i−6.

Next, the PHICH transmission timing associated with regard to the PUSCH transmission, that is, considering the PUSCH as a reference point, PHICH transmission timing indicating the ACK/NACK of the PUSCH can be shown as below.

In the FDD, for the PUSCH transmitted from a user equipment in subframe n, PHICH reception timing (the timing in the base station) is subframe n+$k_{PHICH}$, here $k_{PHICH}$ is always 4. In the TDD, when a single carrier is configured to a UE or same TDD UL/DL configuration is applied to every serving cell, and if TDD UL/DL configuration is 1 or 6, the PHICH transmission timing transmitted from a UE subframe n is subframe n+$k_{PHICH}$, here, the value of $k_{PHICH}$ is given to Table 5 below.

TABLE 5

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | | 4 | 7 |

Table 5 is about the value of index $k_{PHICH}$ indicating the PHICH timing considered in the TDD. Here, $k_{PHICH}$ indicates that, when a UE transmits the PUSCH in subframe n, the PHICH indicating the ACK/NACK of the PUSCH is received in subframe n+$k_{PHICH}$. For example, when the TDD UL/DL configuration is 1, if the UE transmits the PUSCH in subframe #2 (n=2), the related PHICH indicates that the PHICH is received to a user equipment in subframe #6(n+$k_{PHICH}$=2+4=6).

In the TDD, when two or more carrier is configured to a UE and at least two serving cells have different TDD UL/DL configurations, the PHICH reception timing is determined based on the UL-reference UL/DL configuration. That is, PHICH reception timing associated with PUSCH transmitted by a UE in subframe n of a serving cell is subframe n+$k_{PHICH}$, the value of $k_{PHICH}$ is determined by the above Table 5, and in this case, "TDD UL/DL configuration" in Table 5 refers to the "UL-reference UL/DL configuration."

Further, the PUSCH transmission timing following the UL grant and/or the PHICH reception can be shown as below. Hereinafter, the reception of the UL grant may mean that the PDCCH/EPDCCH having a UL DCI format is detected with respect to the corresponding user equipment.

1. In the FDD, the PUSCH transmission following the UL grant (by PDCCH/EPDCCH) and/or the PHICH transmitted to a user equipment in subframe n is performed in subframe n+4.

2. In the TDD, when a single carrier is configured to user equipment or same TDD UL/DL configuration is applied to every serving cell, the PUSCH transmission timing is as below.

(1) When the TDD UL/DL configuration is either 1 or 6, and there is normal HARQ operation (that is, non-subframe bundling operation), and the detection of the PDCCH/EPDCCH having the UL DCI format and/or the PHICH transmission is happened in subframe n, a user equipment adjusts the corresponding PUSCH transmission to subframe n+k, according to the PDCCH/EPDCCH or PHCICH information. In this case, the value of k is determined by the Table 6 below.

TABLE 6

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |

TABLE 6-continued

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 5 | | | | | | | | | 4 | |
| 6 | | 7 | 7 | | | | 7 | 7 | | 5 |

Here, k indicates that, when user equipment received UL grant (by PDCCH/EPDCCH) and/or PHICH in subframe n, the PUSCH transmission is performed in subframe n+k, which is located k subframes after the subframe n in which the UL grant and/or the PHICH is transmitted. For example, when the TDD UL/DL configuration is 1, if a UE receives the UL grant and/or PHICH from subframe #1 (n=1), the corresponding PUSCH transmission occurs in subframe #7(n+k=1+6).

(2) 1) When the TDD UL/DL configuration is 0, and there is normal HARQ operation, and the detection of the PDCCH/EPDCCH having the UL DCI format and/or the PHICH transmission is happened in subframe n, a user equipment adjusts the corresponding PUSCH transmission to subframe n+k, if the most significant bit (MSB) of the UL index included in the PDCCH/EPDCCH set as 1 or the PHICH, which is corresponding to $I_{PHICH}=0$ is transmitted in subframe n=0 or 5. In this case, k is determined by the above Table 6. 2) If the TDD UL/DL configuration is 0, and there is normal HARQ operation, and, if the least significant bit (LSB) of the UL index set as 1 or the PHICH, which is corresponding to $I_{PHICH}=1$ is transmitted in subframe n=1 or 6, then the UE adjusts the corresponding PUSCH transmission as subframe n+7. 3) If the TDD UL/DL configuration is 0, and the both MSB and LSB included in the PDCCH/EPDCCH having the UL DCI format set in subframe n, the user equipment adjusts the corresponding PUSCH transmission to subframe n+k or subframe n+7. In this case, k is determined by the above Table 6.

3. In the TDD, if two or more serving cells are configured to UE and at least two serving cells have different UL-DL configurations, the PUSCH transmission timing is as below.

(1) When the TDD UL/DL configuration is either 1 or 6, with regard to the serving cell in normal HARQ operation, and the detection of the PDCCH/EPDCCH having the UL DCI format and/or the PHICH transmission is performed in subframe n, a user equipment adjusts the corresponding PUSCH transmission to subframe n+k, according to the PDCCH/EPDCCH or PHCICH information. In this case, the value of k is determined by the above Table 6.

(2) 1) With regard to the serving cell in normal HARQ operation when UL-reference UL/DL configuration is 0, if the detection of the PDCCH/EPDCCH having the UL DCI format and/or the PHICH transmission is performed in subframe n and if the MSB of the UL index included in the PDCCH/EPDCCH set as 1 or the PHICH, which is corresponding to $I_{PHICH}=0$, is transmitted in subframe n=0 or 5, a user equipment adjusts the corresponding PUSCH transmission to subframe n+k. In this case, k is determined by the above Table 6, and "TDD UL/DL configuration" in Table 6 may refer to the "UL-reference UL/DL configuration." 2) With regard to the serving cell in normal HARQ operation when UL-reference UL/DL configuration is 0, if the least significant bit (LSB) of the UL index included in the PDCCH/EPDCCH having DCI format 0/4 set as 1 or the PHICH, which is corresponding to $I_{PHICH}=1$, is transmitted in subframe n=0 or 5, or the PHICH is transmitted in subframe n=1 or 6, then the user equipment adjusts the corresponding PUSCH transmission as subframe n+7. 3) With regard to the serving cell with the TDD UL/DL configuration as 0, if both MSB and LSB of UL index included in the PDCCH/EPDCCH having the UL DCI format set in subframe n, the user equipment adjusts the corresponding PUSCH transmission to subframe n+k or subframe n+7. In this case, k is determined by the above Table 6, and "TDD UL/DL configuration" in Table 6 may refer to the "UL-reference UL/DL configuration."

According to the above-mentioned reference points, under circumstances such as CA, it may be possible to provide efficient wireless resource allocation usage and HARQ operation to each serving cell even when the TDD UL/DL configuration among serving cells are different. However, recently, the FDD band or carrier and the TDD band or carrier joint operation are considered, and when the existing UL scheduling/HARQ timing is applied, a problem exists such as a plurality of UL resources may not be utilized.

Figure 4:
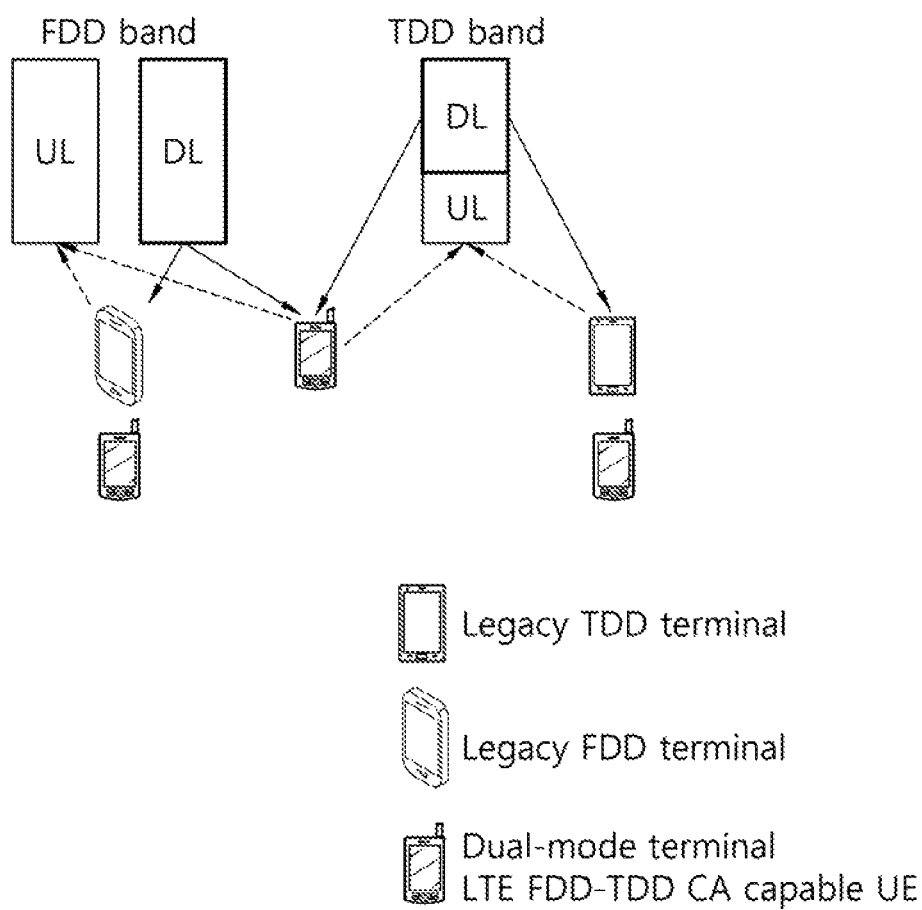
FIG. 4 is a diagram illustrating an example of an FDD-TDD joint operation method application according to an exemplary embodiment of the present invention.

FIG. 4 is a diagram illustrating an example of an FDD-TDD joint operation method application according to an exemplary embodiment of the present invention.

Referring FIG. 4, in case of the TDD legacy UE 120, wireless communication service can only be received through the TDD band, and in case of the legacy FDD UE 140, wireless communication service can only be received through the FDD band. On other hands, in case of the FDD-TDD CA capable UE 100, wireless communication service can be received through the FDD and the TDD bands, and also the CA based wireless communication service is provided through the TDD band carrier and the FDD band carrier.

For those aforementioned TDD-FDD joint operations, for example, the following deployments may be considered.

As an example, the FDD base station and the TDD base station is co-located (for example, CA scenarios 1 through 3), or the FDD base station and the TDD based station is not co-located, but connected through the ideal backhaul (for example, CA scenario 4).

As another example, the FDD base station and the TDD base station is not co-located, and connected through non-ideal backhaul (for example, small cell scenario 2a, 2b, and macro-macro scenario).

In addition, for the TDD-FDD joint operation, following prerequisite may be considered.

First, a UE supporting the FDD-TDD joint operation may access to the legacy FDD single mode carrier and the legacy TDD single mode carrier.

Second, the legacy FDD UEs and the UEs supporting the TDD-FDD joint operation may camp on and be connected to the TDD carrier which is the part of the aforementioned FDD/TDD joint operation network.

Third, the legacy TDD UEs and the UEs supporting the TDD-FDD joint operation may camp on and be connected to the FDD carrier which is the part of the aforementioned FDD/TDD joint operation network.

Fourth, a network architecture enhancement in order to facilitate the FDD-TDD joint operation, for example, with regard to the non-ideal backhaul, may be considered. However, keeping the minimal network architecture changes should be considered since it is still essential in operator's perspective.

In addition, as a UE to support the TDD-FDD joint operation, following UE abilities may be considered.

Figure 5:
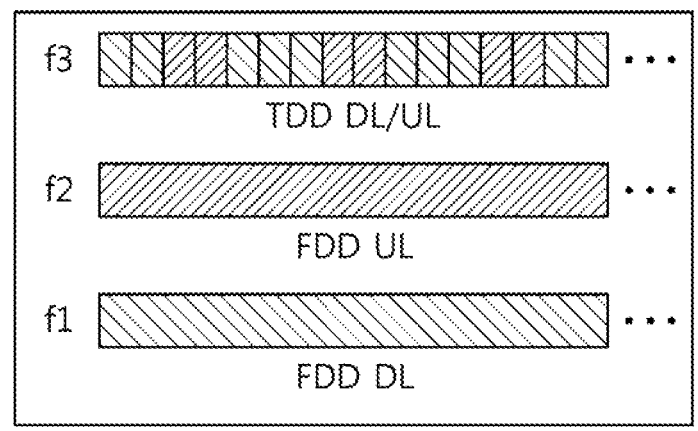
FIG. 5 is a diagram illustrating examples of user equipment capabilities for a TDD-FDD joint operation according to the exemplary embodiment of the present invention.
Figure 5:
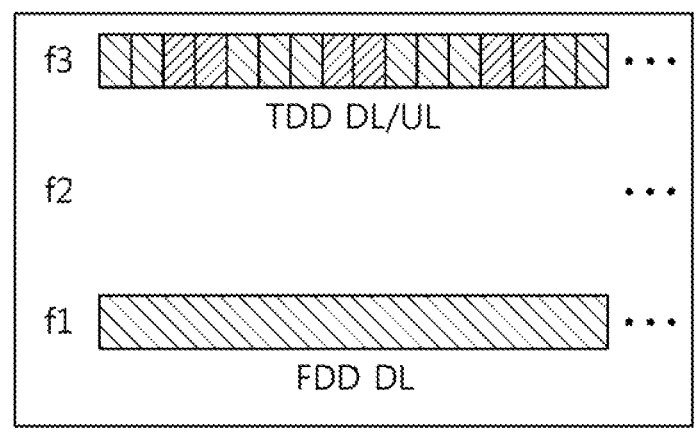
Figure 5:
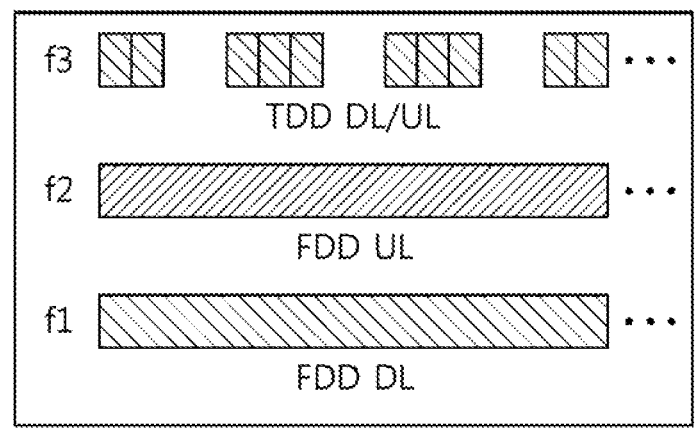

FIG. 5 is examples of UE capabilities for the TDD-FDD joint operation according to an exemplary embodiment of the present invention.

Referring to FIG. 5, (a) indicates that a UE is supporting the CA between the TDD carrier and the FDD carrier; (b) indicates that a UE is supporting the CA between the TDD carrier and the FDD DL carrier; and (c) indicates that a UE is supporting the CA between the TDD DL carrier and the FDD carrier.

As mentioned above, a UE may support different types of the TDD-FDD joint operations, and further, it may perform simultaneous reception (that is, DL aggregation) from the FDD and TDD carriers. Secondly, a UE may perform simultaneous transmission (that is, UL aggregation) from the FDD and TDD carriers, and thirdly, a UE may perform simultaneous transmission and reception (that is, full duplex) from the FDD and TDD carriers.

Meanwhile, a UE may configure a dual connectivity through two or more base stations among base stations that may include at least one serving cell. A dual connectivity is an operation that the UE utilizes wireless resources provided by at least two different network points (for example, a macro base station or a small base station) in RRC_CONNECTED mode. In this case, those abovementioned two different network points may be connected by a non-ideal backhaul. Here, one of those abovementioned two different network points may refer to a macro base station (or a master base station or an anchor base station), remaining network points may refer to small base stations (or secondary base stations or assisting base stations, or slave base stations).

A UE, as mentioned above, may support a TDD-FDD joint operation when the CA and/or dual connectivity is configured to a UE. Hereinafter, exemplary embodiments of the present invention will be explained based on a case where a UE configured to the CA, but aspects of the present invention may be applied to a case of a UE configured to the dual connectivity.

The existing UL scheduling and HARQ method supports the CA among carriers having different TDD UL/DL configurations, but it does not support the above mentioned TDD-FDD joint operation.

The UL scheduling/HARQ timing for a UE with the TDD-FDD CA configuration, if the UE has a self-scheduling configuration (that is, scheduling cell is equal to scheduled cell), may provide, without a big problem, peak data rate to the UE, applying the existing UL scheduling/HARQ timing which corresponds to each of the current duplex modes. However, when a UE is configured to the cross-carrier scheduling (that is, in case of indicating a transmission of the PDCCH/EDPCCH through specific cell by carrier indicator formation (CIF)), a plurality of UL resources may not be utilized, and it cannot provide the peak data rate to the UE. This is because it is a default that the PHICH, which is for indicating the PUSCH re-transmission, is transmitted only though a cell which the UL grant has transmitted.

Figure 6:
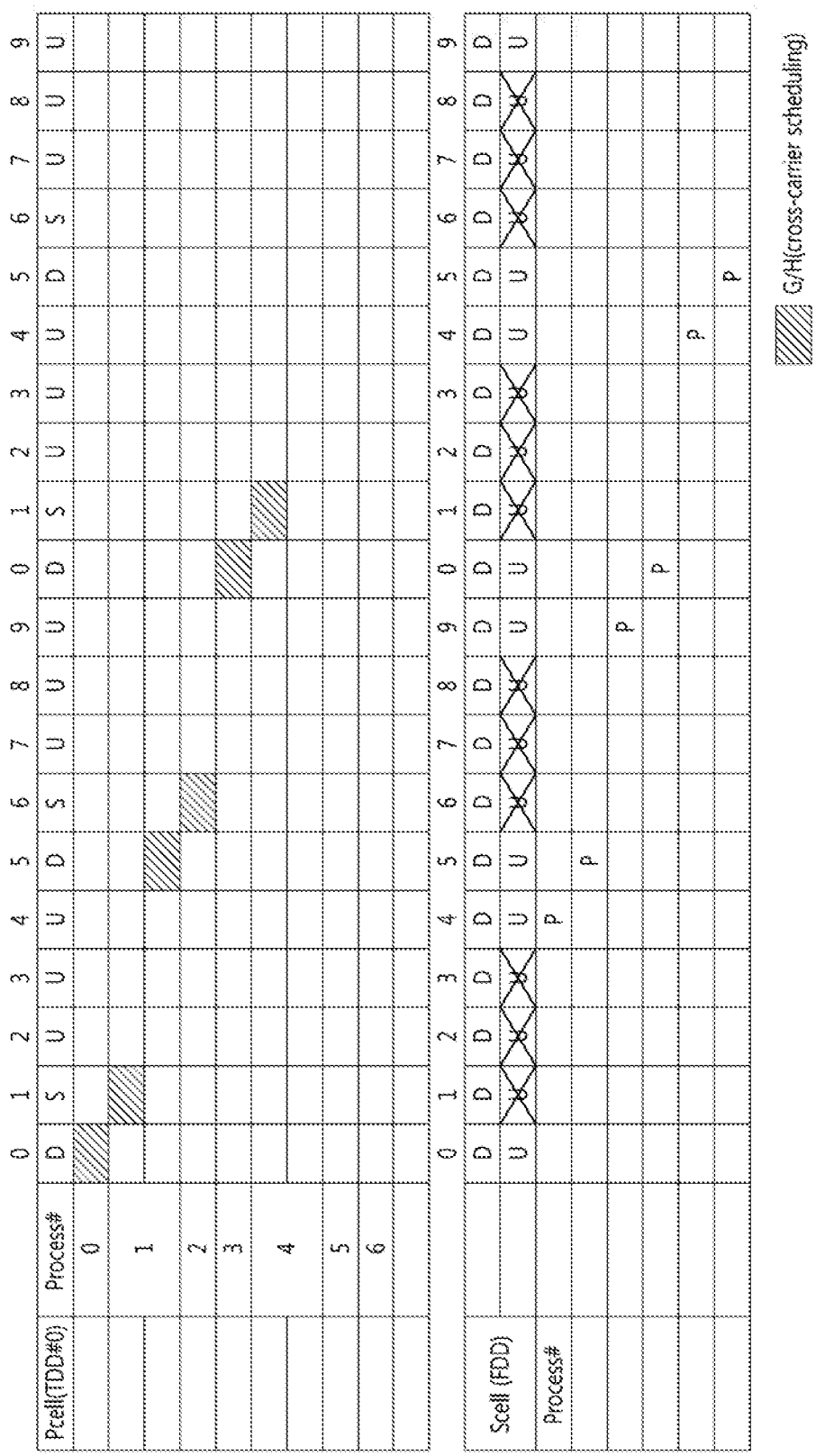
FIG. 6 is a diagram illustrating an example of a limited UL scheduling on a scheduled cell, in case of cross-carrier scheduling is configured in a TDD-FDD CA-configured UE.

FIG. 6 is a diagram illustrating an example of a limited UL scheduling on a scheduled cell, in case of cross-carrier scheduling is configured in a TDD-FDD CA-configured UE. FIG. 6 is a case where a PCell is configured to UE with the TDD UL/DL configuration 0, and a SCell is configured to UE with the FDD. The PCell is considered as the scheduling cell and the SCell as the scheduled cell.

Referring to FIG. 6, G indicates the UL grant, H indicates the PHICH, P indicates the PUSCH, and diagonal pattern G and H indicates the cross-carrier scheduling. The PCell's subframes 0 and 5 are configured as DL subframes, and subframes 1 and 6 are configured as special subfames. Thus, in this case, G/H (G and/or H) may be transmitted from a base station to a UE through subframe #0, 1, 5, and 6. In this case, although the SCell, as the FDD based serving cell, is able to perform the UL transmission in every subframe, according to the existing UL scheduling/HARQ timing, the PUSCH transmission is not performed in subframe #1, 2, 3, 6, 7, 8 and the peak data rate is not provided to a UE. Therefore, new UL scheduling/HARQ timing is designed for the UE which is configured to the TDD-FDD CA and the cross-carrier scheduling.

Here, the UL scheduling/HARQ timing method, which is applicable to each and every existing TDD UL/DL configuration (#0-6) and the CA in the FDD, is proposed. By considering the CA scenario between the FDD band and the TDD band, available combinations are like followings in the Table 7.

TABLE 7

| Scheduling Cell | Scheduled Cell |
| --- | --- |
| TDD UL/DL Configuration #0 | FDD |
| TDD UL/DL Configuration #1 | FDD |
| TDD UL/DL Configuration #2 | FDD |
| TDD UL/DL Configuration #3 | FDD |
| TDD UL/DL Configuration #4 | FDD |
| TDD UL/DL Configuration #5 | FDD |
| TDD UL/DL Configuration #6 | FDD |
| FDD | TDD UL/DL Configuration #0 |
| FDD | TDD UL/DL Configuration #1 |
| FDD | TDD UL/DL Configuration #2 |
| FDD | TDD UL/DL Configuration #3 |
| FDD | TDD UL/DL Configuration #4 |
| FDD | TDD UL/DL Configuration #5 |
| FDD | TDD UL/DL Configuration #6 |

Referring to Table 7, when the cross-carrier scheduling is configured to the UE with the TDD-FDD CA configuration, a scheduling cell may be configured as the TDD UL/DL configuration #0 through #6, and a scheduled cell may be configured as the FDD. Further, scheduling cell may be configured as the FDD, and scheduled cell may be configured as either the TDD UL/DL configuration #0 through #6. Hereinafter, it describes the related embodiments with the assumption that the PCell is a scheduling cell and the SCell is a scheduled cell.

Case 1. In case of the TDD (scheduling cell)-FDD (scheduled cell) CA

In case where the TDD cell is configured as a scheduling cell and the FDD cell as a scheduled cell, the hybrid scheduling method, which combines the cross-carrier scheduling and the self-scheduling, for the FDD cell may be introduced.

In this case, it may conditionally utilize the existing UL scheduling/HARQ timing, and has advantages such as maximization of the utilization of the existing UL scheduling/HARQ timing and the simple realization. In the exemplary embodiments of the present invention, with regard to the CA (or dual connectivity) in the TDD cell and the FDD cell, the application of the UL scheduling/HARQ timing through the cross-carrier scheduling, for example, may follow the process described in the Table 8.

TABLE 8

1. Relationship with the prior PUSCH with regard to tramsmission of the PHICH
(1) The UL-reference UL/DL configuration 1-6, the PUSCH's transmission timing associated with the PHICH received in subframe i is subframe i − k. The value of k follows above Table 3.

TABLE 8-continued (2)The TDD UL/DL configuration 0, in case when it receives the PHICH corresponding to $I_{PHICH}$ = 0 received in subframe i, the relevant PUSCH transmittion is subframe i − k. The value of k follows above Table 3. If otherwise when it receives the PHICH corresponding to $I_{PHICH}$ = 1, the relevant PUSCH transmission is subframe i − 6.
2. The PHICH timing with regard to the PUSCH transmission
The PHICH transmission timing with regard to PUCSH transmission in subframe n in serving cell c is n + $k_{PHICH}$, and the value of $k_{PHICH}$ here is selected based on above UL reference UL/DL configuration by referring the above Table 5.
3. The PUSCH tramsmission timing with regard to the UL grant and/or PHICH reception
(1) With regard to a servin cell with the UL reference UL/DL configuration as either 1 or 6, and normal HARQ operation,, if the detection of the PDCCH/EPDCCH which have the UL DCI format and/or the PHICH transmission is occurred on subframe n, the UE adjusts the corresponding PUSCH transmission with subframe n + k. In this case, k follows above Table 6, and in this case the "TDD UL/DL configuration" in Table 6 may refer to "UL-reference UL/DL configuration".
(2) 1) With regard to the serving cell with the UL reference UL/DL configuration as 0 and normal HARQ operation, if the transmission of detection of PDCCH/EPDCCH having UL DCI format and/or PHICH is performed on subframe n, if when MSB of the UL index which included in the PDCCH/EPDCCH is set to 1, or if above PHICH corresponding to $I_{PHICH}$ = 0 is received in subframe n = 0 or 5, the UE adjusts the corresponding PUSCH transmission to subframe n + k. In this case, the value of k may follow above Table 6, and the "TDD UL/DL configuration" of Table 6 may refer to "UL reference UL/DL configuration". 2) With regard to a serving cell with the UL reference UL/DL configuration as 0 and normal HARQ operation, if when LSB of the UL index which is included in the PDCCH/EPDCCH with DCI format 0/4 is set to 1, or if PHICH corresponding $I_{PHICH}$ = 1 received in subframe n = 0 or 5, or if the PHICH is received in subframe n = 1 or 6, the UE adjusts the corresponding transmission of PUSCH to n + 7.
3) If, with regard to a serving cell with the TDD UL/DL configuration as 0, both MSB and LSB of UL index which is included in the PDCCH/EPDCCH with UL DCI format are set to subframe n, the UE adjusts the corresponding PUSCH transmission to subframe n + k and n + 7. In this case, k may follow above Table 6, and above "TDD UL/DL configuration" of Table 6 may refer to UL-reference UL/DL configuration.

First Exemplary Embodiment

The first exemplary embodiment is a method which combines a UL scheduling/HARQ timing based on the TDD UL/DL configuration #0 and self scheduling/HARQ timing.

According to the first exemplary embodiment, with regard to cross-carrier scheduling, the UL scheduling/HARQ timing is applied for the FDD scheduled cell based on the UL reference UL/DL configuration #0 on TDD scheduling cell, and the UL scheduling/HARQ timing by self scheduling is applied to the remaining subframes which the UL scheduling/HARQ timing for the FDD scheduling cell through cross-carrier scheduling is not applicable. For example, if based on the UL reference UL/DL configuration #0, the TDD scheduling cell may transmit the UL grant/PHICH for the FDD scheduled cell only in subframe #0, 1, 5, and 6, and in this case, according to Table 8, the corresponding PUSCHs can only be transmitted in the subframe #2, 3, 4, 7, 8, 9 in the FDD scheduled cell. That is, in this case, the FDD scheduled cell may perform the UL transmission in either subframe #0 or 9, but subframe #0, 1, 5, 6 do not adjusted under the PUSCH transmission timing. This does not satisfy the purpose in supporting CA to fulfill high data transmission rate requirement. Therefore, according to present invention, self scheduling is performed in the FDD scheduled cell, to adjust the above subframes #0, 1, 5, and 6 as to the PUSCH transmission timing. For example, to adjust subframe #0, 1, 5, and 6 as to the PUSCH transmission timing, at least one of UL grant and PHICH may be transmitted in subframes # n−4 (n=0, 1, 5, 6) of the FDD scheduled cell. In this case, as a result, a HARQ operation may be supported in every subframes of the FDD scheduled cell. This exemplary embodiment may be applied when the TDD UL/DL configuration of the scheduling cell is either #0 or #6 and scheduled cell is configured as the FDD.

Figure 7:
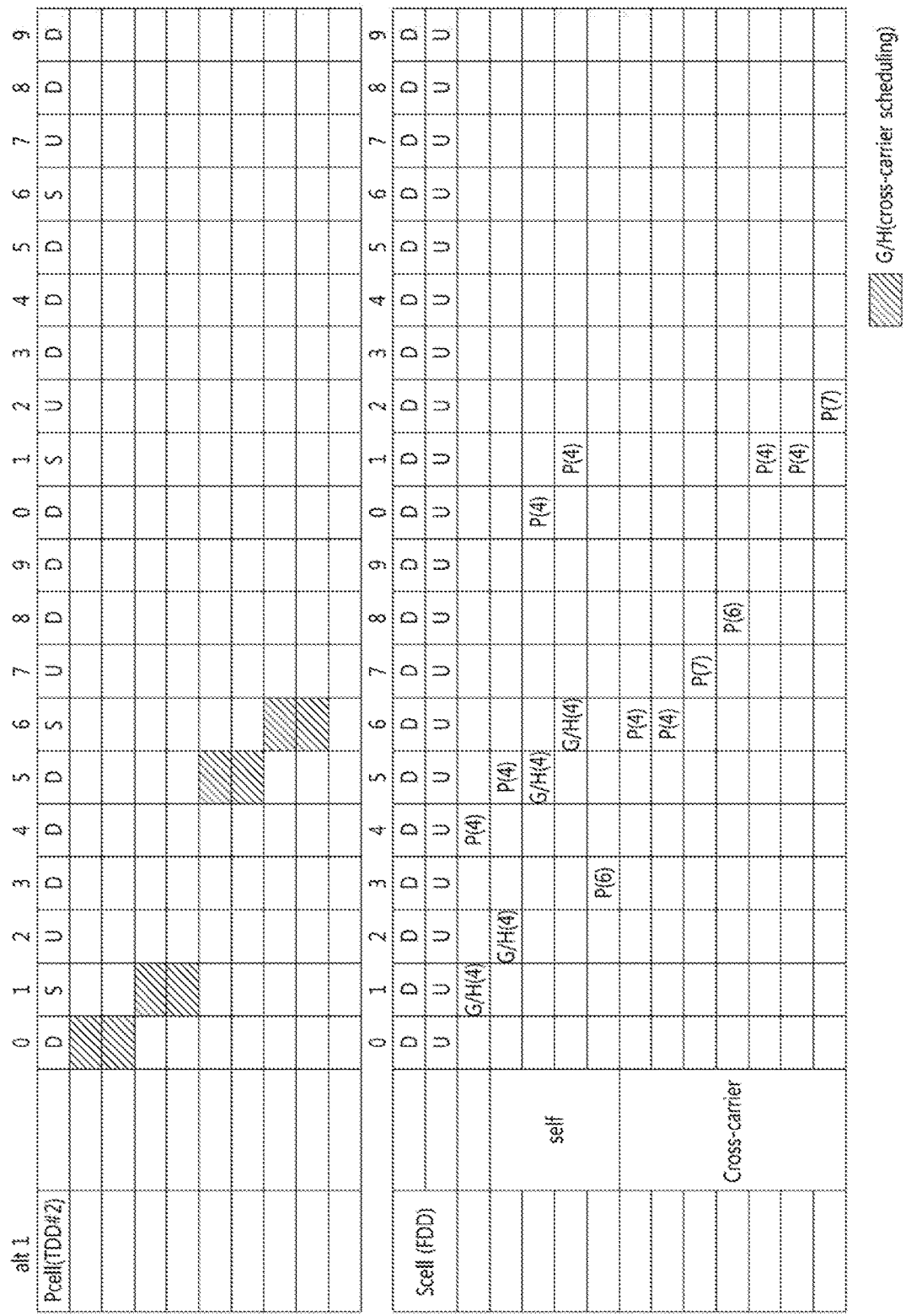
FIG. 7 is a diagram illustrating an example of a UL scheduling/HARQ timing as a first exemplary embodiment of the present invention.

FIG. 7 is a diagram illustrating an example of a UL scheduling/HARQ timing as first exemplary embodiment of the present invention. FIG. 7 is a case where the PCell is a scheduled cell configured as the TDD UL/DL #2 and the SCell is a scheduled cell configured as the FDD. Referring to FIG. 7, G indicates the UL grant, H indicates the PHICH, and P indicates the PUSCH, the diagonal pattern G/H indicates the cross-carrier scheduling. The G/H(m) indicates that the PUSCH is transmitted, after G and/or H is transmitted, from m-th subframe, and P(m) indicates that the UL grant/PHICH for the re-transmission is transmitted, after PUSCH is transmitted, from m-th subframe. Below is the same.

The PCell (scheduling cell) is configured as the TDD UL/DL configuration #2, subframe #0, 3, 4, 5, 7, and 9 are configured as the DL subframe, and subframe #1, and 6 are configured as special subframes, and since the UL scheduling/HARQ timing control is based on the UL reference UL/DL configuration #0, the PCell may transmit the UL grant/PHICH for the Scell (scheduled cell) only in subframe 0, 1, 5, and 6. Thus, the G/H for the SCell transmitted to the cross-carrier scheduling may be transmitted to a UE from a base station through subframe #0, 1, 5, 6, and the corresponding PUSCH transmission timing corresponds to subframe #4, 7, 8, 9, 2, and 3 of the SCell. In this case, the G/H for the Scell, which is transmitted as a self scheduling, may be transmitted from a base station to a UE in subframe # m−4 (m=0, 1, 5, 6) of the SCell.

Figure 8:
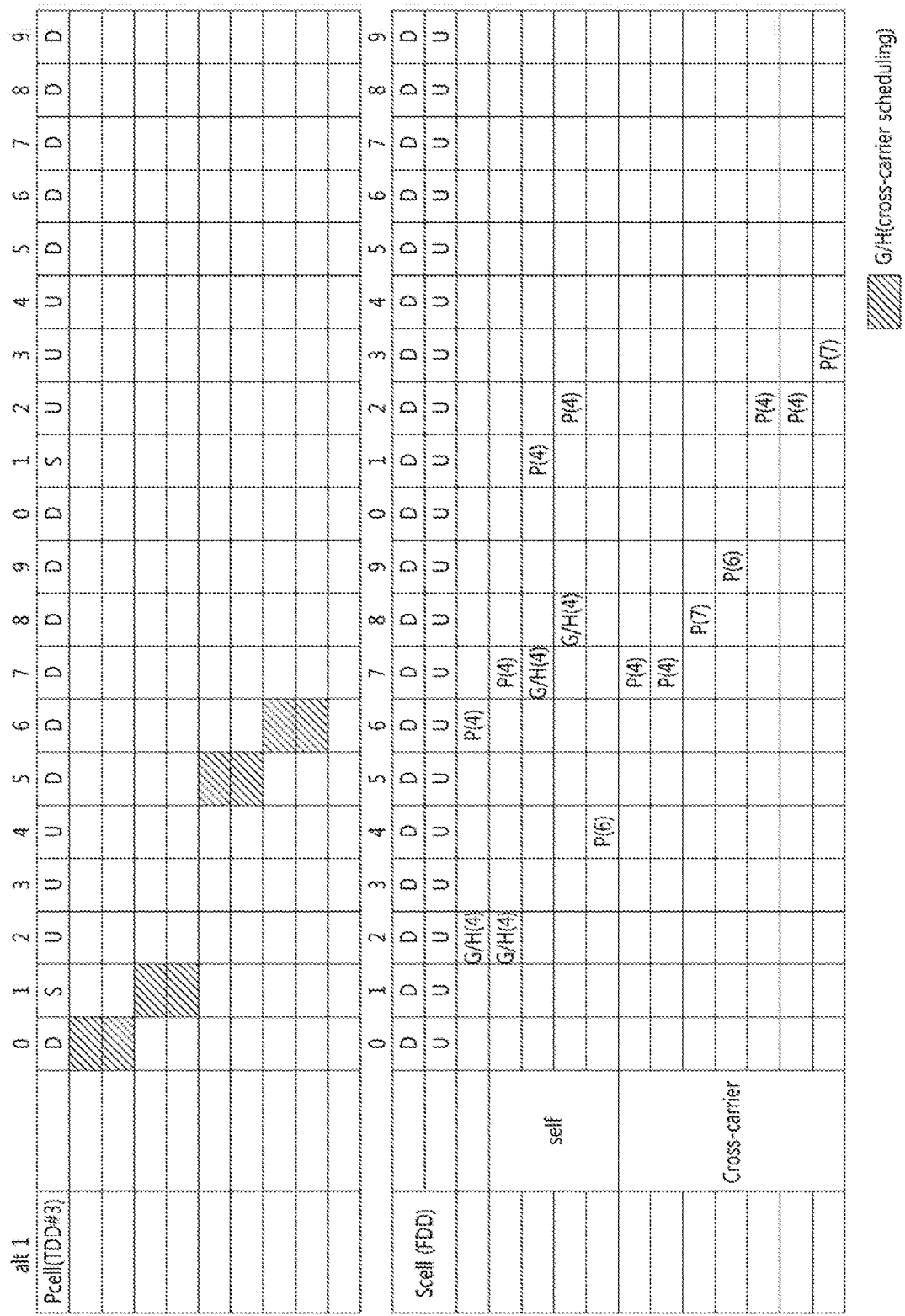
FIG. 8 is a diagram illustrating another example of a UL scheduling/HARQ timing as the first exemplary embodiment of the present invention.

FIG. 8 is a diagram illustrating another example of a UL scheduling/HARQ timing as the first exemplary embodiment of the present invention. FIG. 8 is a case where the PCell is a scheduled cell configured as the TDD UL/DL #3 and the SCell is a scheduled cell configured as the FDD.

A PCell (scheduling cell) is configured as the TDD UL/DL configuration #3, subframe #0, 5, 6, 7, 8 and 9 are configured as the DL subframe, and subframe #1, is configured as special subframe, and since the UL scheduling/HARQ timing control is based on the UL reference UL/DL configuration #0, the PCell may transmit the UL grant/PHICH for the Scell (scheduled cell) only in subframe 0, 1, 5, and 6. Thus, the G/H for the SCell transmitted to the cross-carrier scheduling may be transmitted to a UE from a base station in subframe #0, 1, 5, 6, and the corresponding PUSCH transmission timing corresponds to subframe #4, 7, 8, 9, 2, and 3 of the SCell. In this case, the G/H for the Scell, which is transmitted as a self scheduling, may be transmitted from a base station to a UE in subframe # n−4 (m=0, 1, 5, 6) of the SCell.

Second Exemplary Embodiment

The second example embodiment is a method which combines the UL scheduling/HARQ timing based on the TDD UL/DL configuration and the self-scheduling/HARQ timing.

According to the second exemplary embodiment, in the cross-carrier scheduling, based on the TDD UL/DL configuration based on the TDD scheduling cell (or the TDD UL/DL configuration in the TDD scheduling cell is set to the UL-reference UL/DL configuration based on above UL-reference UL/DL configuration), it applies the UL scheduling/HARQ timing for the FDD scheduled cell, and, it applies the UL scheduling/HARQ timing by self-scheduling for the remaining subframes that is not associated with the UL scheduling/HARQ timing for FDD scheduled cell through the cross carrier scheduling.

Figure 9:
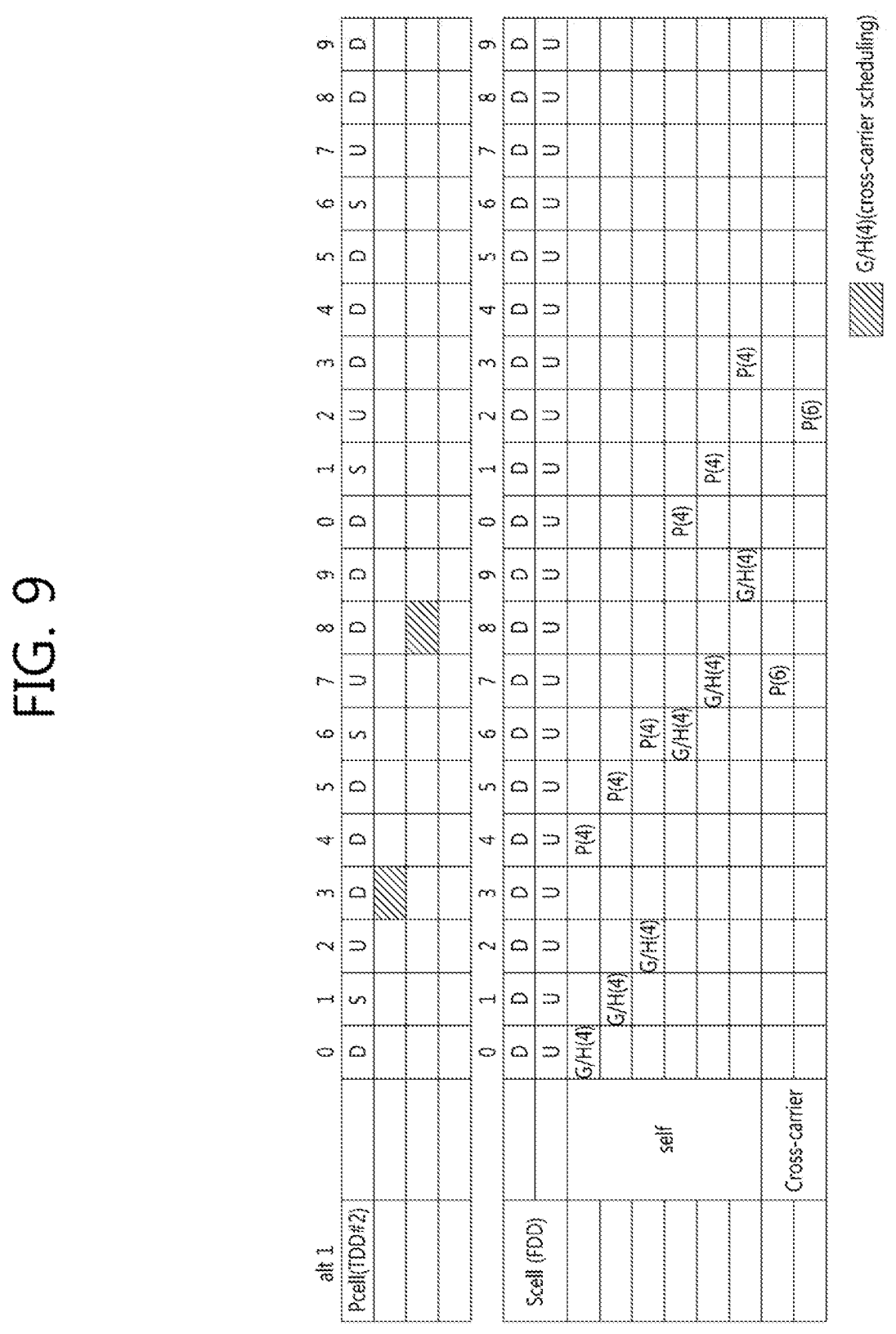

FIG. 9 is a diagram illustrating an example of a UL scheduling/HARQ timing as a second exemplary embodiment of the present invention. FIG. 9 illustrates the case where the PCell, for example, is a scheduling cell configured to the TDD UL/DL configuration #2, and the Scell is a scheduled cell configured to the FDD.

The PCell (scheduling cell) is configured to be the TDD UL/DL configuration #2, subframe #0, 3, 4, 5, 8, 9 are configured to be the DL subframe, and sub-frame #1, 6 is configured to be a special subframe. Since the TDD UL/DL configuration value is 2, the PCell may only transmit the UL grant/PHICH on sub-frame #3, 8 for the SCell (scheduled cell). Thus, the G/H for the SCell that is transmitted through the cross-carrier scheduling may be transmitted from a base station to a UE through subframe #3, 8 of the PCell, and the corresponding PUSCH transmission timing would be subframe #7, 2 of the SCell. In this case, the G/H for the SCell transmitted as a self scheduling may be transmitted to a UE from a base station through subframe # m−4 (m=0, 1, 3, 4, 5, 6, 8, 9) of the SCell.

Figure 10:
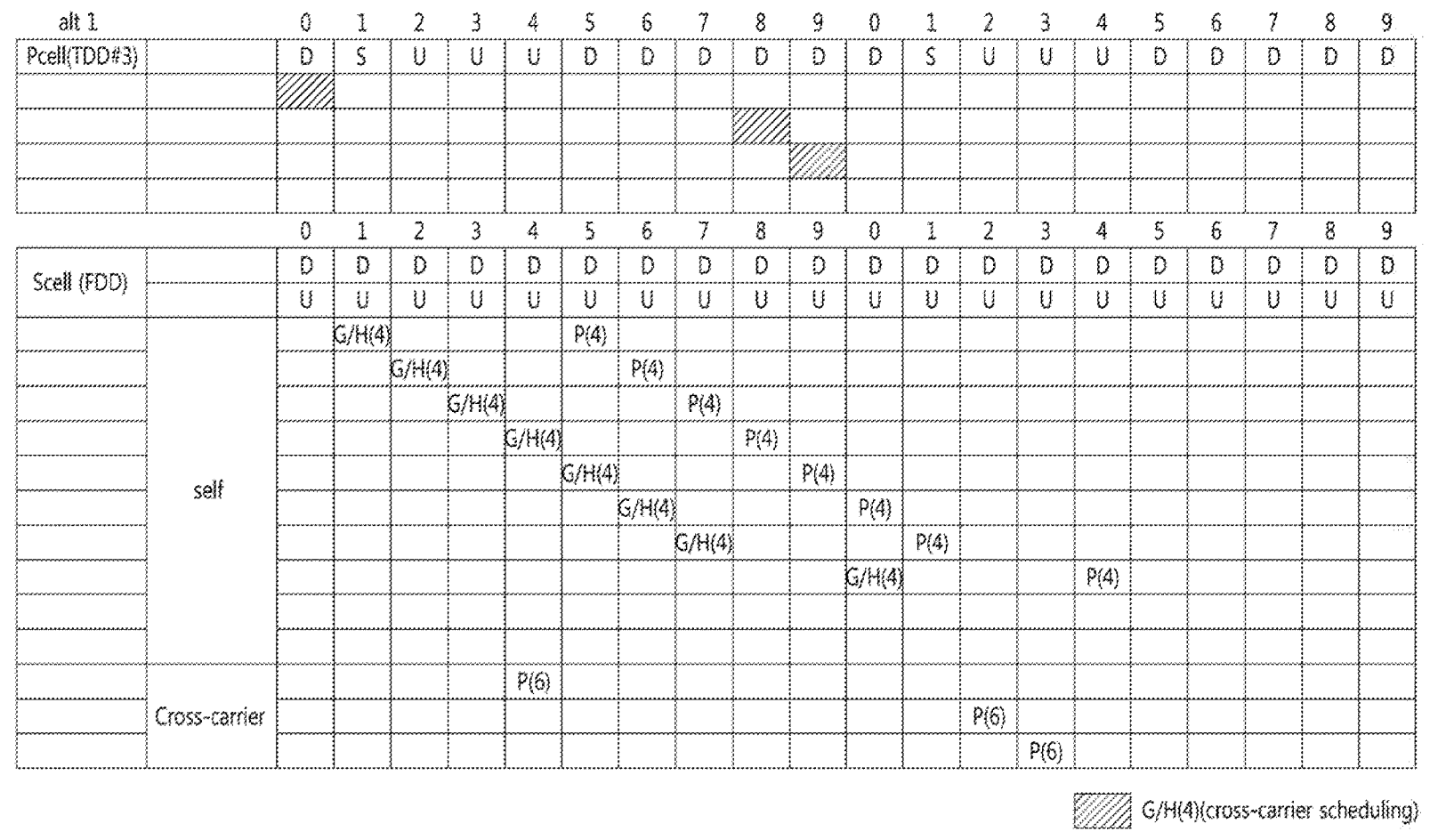

FIG. 10 is a diagram illustrating another example of a UL scheduling/HARQ timing as the second exemplary embodiment of the present invention. FIG. 10 illustrates, for example, where the Pcell is a scheduling cell configured to be the TDD UL/DL configuration #3, and the Scell is a scheduled cell configured to be FDD.

The PCell (scheduling cell) is configured to be the TDD UL/DL configuration #3, subframe #0, 5, 6, 7, 8, 9 are configured to be the DL subframe, and subframe #1 is configured to be a special subframe. In this case, since the UL-reference UL/DL configuration value is 3, the PCell may only transmit the UL grant/PHICH for the SCell (scheduled cell) on subframe #0, 8, 9. Thus, the G/H for Scell that is transmitted through the cross-carrier scheduling may be transmitted to a UE from a base station through subframe #0, 8, 9 of the PCell, and the corresponding PUSCH transmission timing corresponds to subframe #4, 2, 3 of the SCell. In this case, the G/H for the SCell transmitted as a self scheduling may be transmitted to a UE from a base station through subframe # m−4 (m=0, 1, 4, 5, 6, 7, 8, 9) of the SCell.

Third Exemplary Embodiment

The third exemplary embodiment is a method that applies the same timing of the existing FDD UL HARQ scheduling in the cross-carrier scheduling (i.e., after the UL Grant/PHICH is transmitted in subframe # n from the base station, a UE transmits the PUSCH in subframe n+4, and UL grant/PHICH receives the PHICH that was transmitted in the # i+4, but the method is applying the UL scheduling/HARQ timing by switching to the self-scheduling only in the special subframe. Here, the special subframes mean that, when the existing FDD UL scheduling/HARQ timing is applied, those subframe which are unable to transmit the G/H in the scheduling cell. In the third exemplary embodiment, it supports the UL scheduling/HARQ timing by switching from these other subframe to the self scheduling. If following the third illustrating example, the current LTE standard is less affected, while the UL scheduling/HARQ operation may be smoothly performed in a UE with the TDD-FDD CA (or dual connection) configuration.

Figure 11:
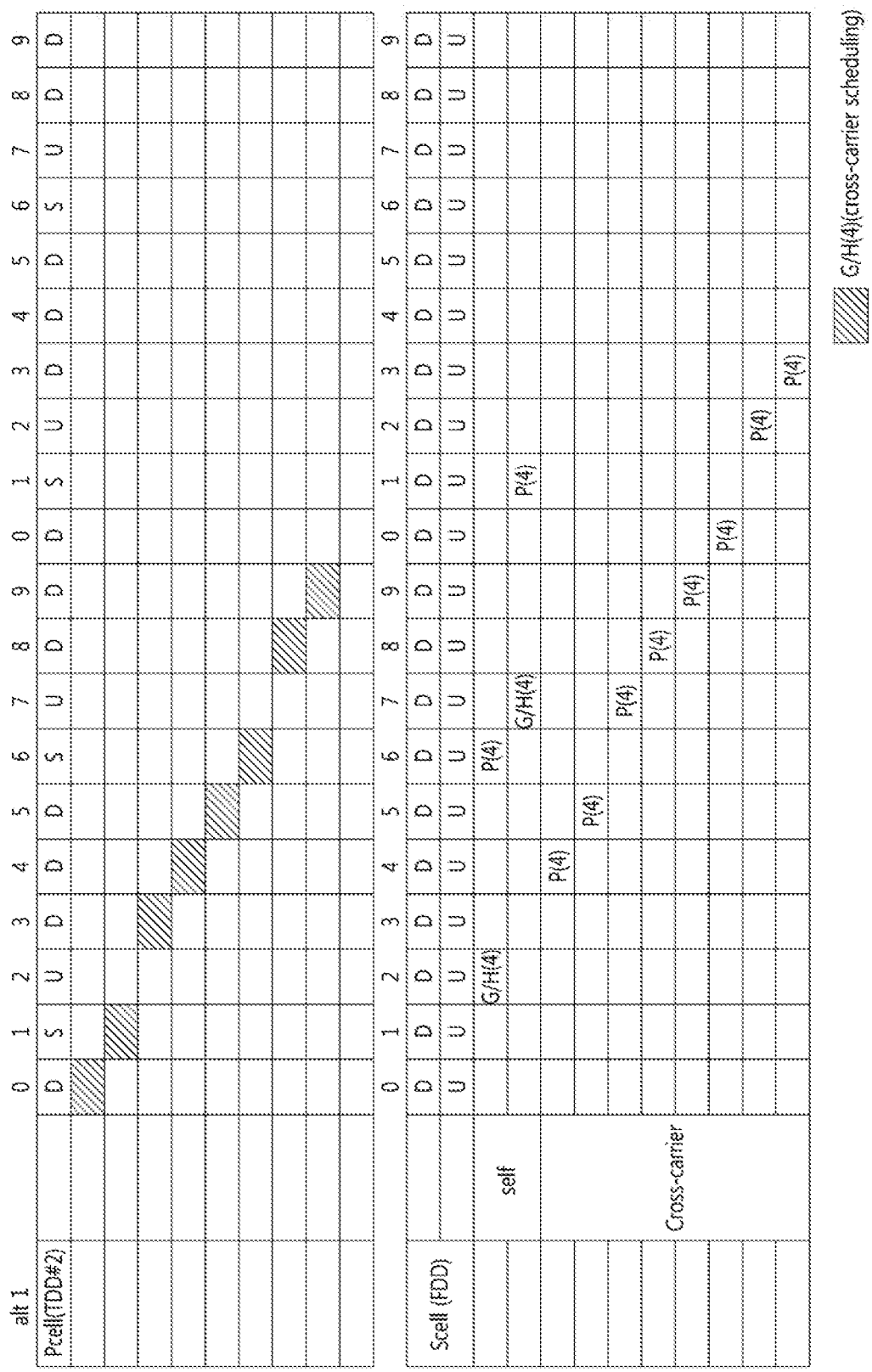
FIG. 11 is a diagram illustrating an example of a UL scheduling/HARQ timing as a third exemplary embodiment of the present invention.

FIG. 11 illustrates an example of a UL scheduling/HARQ timing as a third exemplary embodiment of the present invention. FIG. 11 is a case where the PCell is a scheduling cell which is configured to the TDD UL/DL configuration #2 and the SCell is configured to the FDD.

The PCell (scheduling cell) is configured as the TDD UL/DL configuration #2, so subframe #0, 3, 4, 5, 8, 9 is configured as DL subframe and subframe #1, 6 is configured as special subframe. Therefore, a base station is able to transmit the G/H for he SCell (scheduled cell) in sub-frame #0, 1, 3, 4, 5, 6, 8, 9 of the PCell, and the PUSCH transmission timing is corresponding to subframe # n+4 (n=0, 1, 3, 4, 5, 6, 8, 9) of the SCell. In this case, the G/H, that is for the SCell, which is transmitted by a self scheduling, may be sent to a base station through remaining subframe #2, 7 of the SCell.

Case 2. In Case of the FDD (Scheduling Cell)-TDD (Scheduled Cell) CA

In a case where the FDD cell is configured as a scheduling cell and the TDD cell is configured as scheduled cell, the number of DL subframe of the scheduling cell is more than the number of subframe of the scheduled cell, and the UL scheduling/HARQ timing may be applied based on the TDD UL/DL configuration in the TDD scheduled cell. In this case, the TDD UL/DL configuration of the TDD scheduled cell may refer to the UL-reference UL/DL configuration.

In addition, above proposed methods may be selectively used in accordance with the TDD-FDD CA combinations. For example, the combination of the TDD UL/DL configuration 0 and the FDD CA may use the first exemplary embodiment, if not, it may use the second exemplary embodiment or the third exemplary embodiment.

Figure 12:
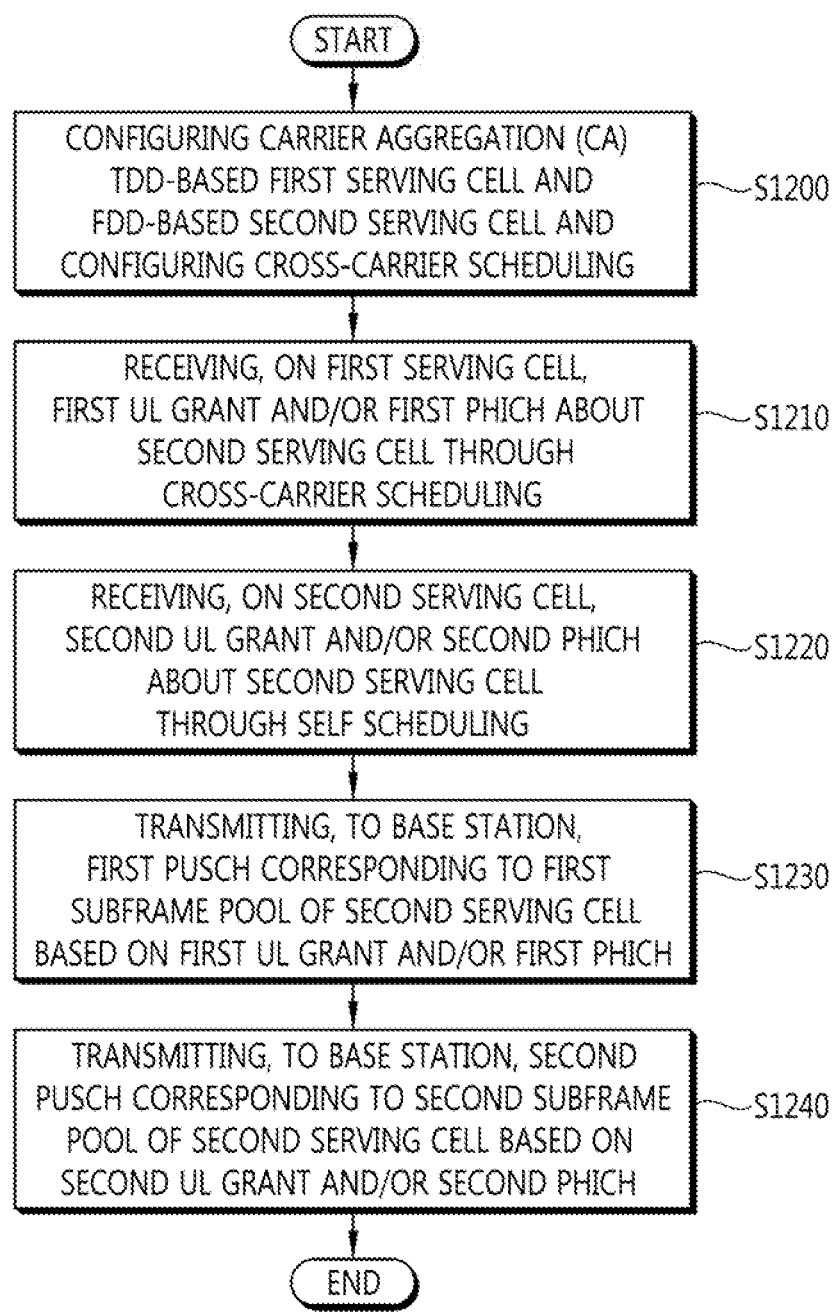
FIG. 12 is a flowchart illustrating an example of the UL scheduling/HARQ operation of a UE as an exemplary embodiment of the present invention.

FIG. 12 is a flowchart illustrating an example of the UL scheduling/HARQ operation of a UE as an exemplary embodiment of the present invention. FIG. 12 explains based on a UE with the TDD based serving cell or the FDD based serving cell and CA configuration, and as mentioned above, the present invention may be applied not only to he CA, but a UE with the dual connectivity configuration.

Referring to FIG. 12, the first serving cell based on the TDD or the second serving cell based on the FDD and the scheduling method indicating the cross-carrier scheduling from the first serving cell to second serving cell is performed on the UE S1200. For the configuration of the first serving cell based on the abovementioned TDD, second serving cell based on the FDD and CA, the UE may receive the TDD-FDD CA configuration information and configuration information as to the scheduling method through RRC signaling. In this case, for example, the abovementioned first serving cell may become a PCell, above the second serving cell may become a SCell. Also, when the cross-carrier scheduling is supported, the abovementioned first serving cell may be a scheduling cell, and the above-mentioned second serving cell may become a scheduled cell.

A UE receives the first UL grant and/or the first PHICH (S1210) associated with the second serving cell through the cross-carrier scheduling in the above the first serving cell. In this case, the above-mentioned reception of the first UL grant and/or the first PHICH may be performed according to following standards.

According to the first exemplary embodiment of the present invention, the reception of the above-mentioned first UL grant and/or the first PHICH, regardless of the configuration of the TDD UL/DL of the first serving cell, may be based on the TDD UL/DL configuration #0. That is, the reception of above the first UL grant and/or the first PHICH may be performed in subframe #0, 1, 5, and 6 which are the DL subframes and special subframes associated with the TDD UL/DL's configure #0. In this case, the TDD UL/DL configuration #0 may be referred to the UL-reference UL/DL configuration.

According to the second and third exemplary embodiment of the present invention, the reception of the above-mentioned first UL grant and/or the first PHICH may be based on the above-mentioned TDD UL/DL configurations of the first serving cell. That is, the reception of the above-mentioned first UL grant and/or the first PHICH may be performed among DL subframes and special subframes associated with the above-mentioned TDD UL/DL configuration of the first serving cell.

A UE receives the second UL grant and/or the second PHICH associated with the second serving cell through a self-scheduling in the above-mentioned second serving cell S1220. In this case, the reception of the second UL grant and/or the second PHICH may be performed to transmit the second PUSCH from the remaining subframes other than subframes in the first subframe's pool which may be indicated as the transmission timing of the first PUSCH through the above-mentioned first UL grant and/or the first PHICH. In this case, the aggregation of the remaining subframe may be referred to the second subframe pool. In this case, the reception of above the second UL grant and/or the second PHICH may be performed according to the following standards.

According to the first exemplary embodiment of the present invention, the reception of above the second UL grant and/or the second PHICH may be performed at subframe # m−4 (m is one of subframes #2, 3, 4, 7, 8, and 9).

According to the second or the third exemplary embodiment of the present invention, the reception of above the second UL grant and/or the second PHICH is performed on subframe # i−4, and the above-mentioned i indicates the subframe number which the above-mentioned second PUSCH is transmitted from the above-mentioned second subframe pool.

A UE transmits the first PUSCH that is corresponding to the first subframe pool in the second serving cell to a base station based on above the first UL grant and/or the first PHICH S1230. In this case, a UE may adjust the timing of transmission of the first PUSCH based on the TDD UL/DL #0. That is, considering the UL reference UL/DL configuration as #0, following the reference points mentioned on Table 8, the transmission timing of the first PUSCH in the first subframe pool may be adjusted.

A UE transmits the second PUSCH that corresponds to the above-mentioned second subframe pool of the second serving cell based on the above-mentioned second UL grant and/or the second PHICH to a base station S1240. In this case, the transmission timing of the above-mentioned second PUSCH may be adjusted to the forth subframe that the above-mentioned second UL grant and/or the second PHICH is received, like the existing timings of the HARQ operation based on the FDD. In this case, the second subframe pool, as mentioned above, may be include remaining subframes other than subframes included in the first subframe pool.

Figure 13:
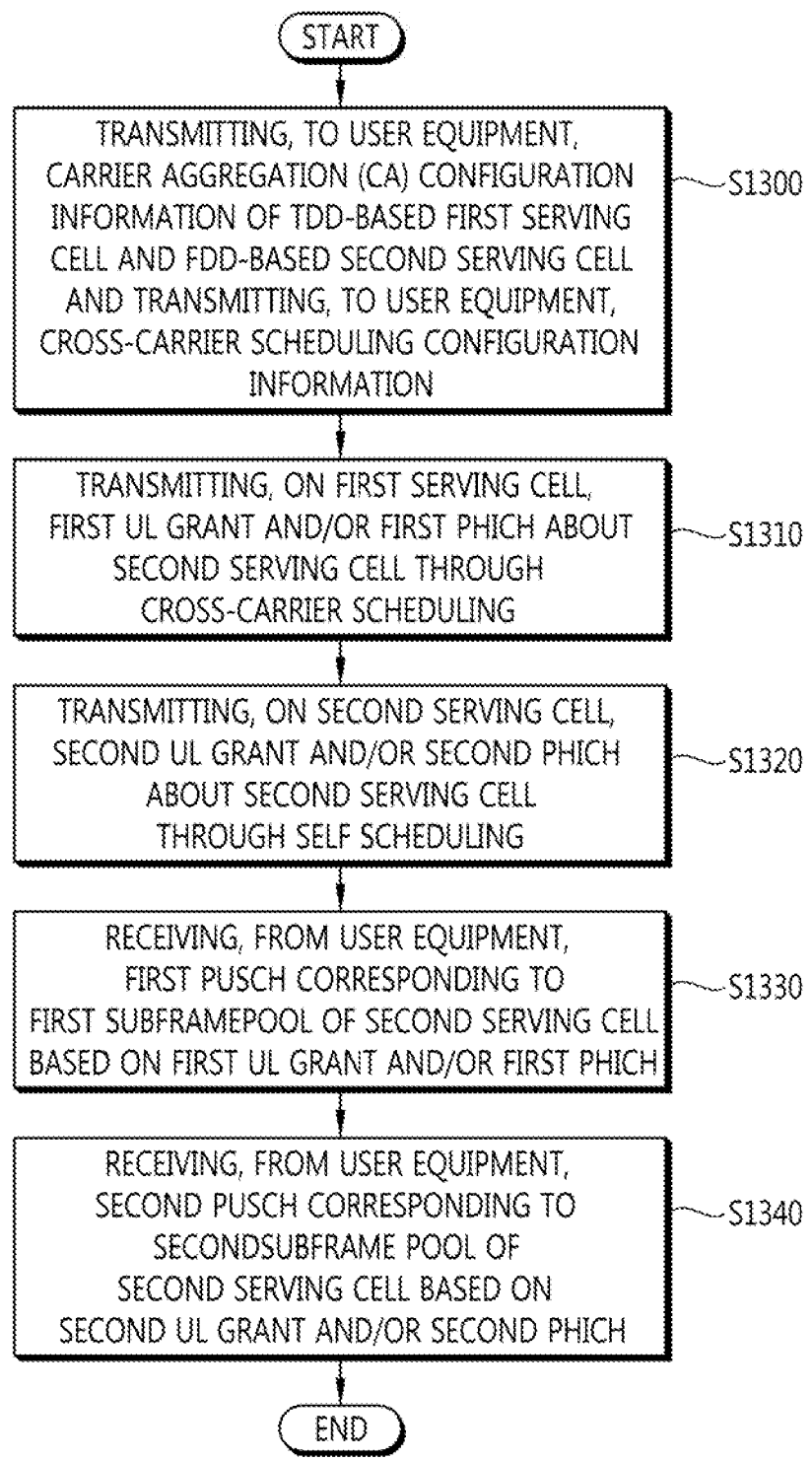
FIG. 13 is a flowchart illustrating an example of the UL scheduling/HARQ operation of a base station as an exemplary embodiment of the present invention.

FIG. 13 is a flowchart that illustrating an example of the UL scheduling/HARQ operation of a base station as an exemplary embodiment of the present invention. FIG. 13 explains, based on the case where the CA is configured and serving cell based on the FDD and serving cell based on the TDD on a UE, and as mentioned above, the present invention may be applied not only to the CA, but also to when dual connectivity is configured.

Referring to FIG. 13, a base station transmits configuration information to indicate the scheduling of the second serving cell in the first serving cell, and the CA configuration of the first cell based on the TDD and the second cell based on the FDD S1300. For the configuration that indicates the scheduling of the second serving cell in the first serving cell, and the CA configuration of the first cell based on the TDD and the second cell based on the FDD, a base station may transmit configuration information with regard to the scheduling of the first serving cell based on the TDD and the CA configuration of the second serving cell based on the FDD through the RRC signaling to the UE. In this case, for example, the first serving cell may be a PCell, and the second serving cell may be a SCell. Further, if the CA scheduling is configured to a UE, the above-mentioned first serving cell may be a scheduling cell, and the above-mentioned second serving cell may be a scheduled cell.

A base station, from the first serving cell, through a cross-carrier scheduling, transmits the first UL grant and/or the first PHICH associated with the above second serving cell to a UE S1310. In this case, the transmission of the above-mentioned first UL grant and/or the first PHICH may be performed according to the reference points mentioned in S1210.

A base station transmits the second UL grant and/or the second PHICH from the above-mentioned second serving cell, through a self scheduling, to a UE S1320. In this case, the transmission of the above-mentioned second UL grant and/or the second PHICH may be performed to transmit the second PUSCH from remaining subframes which are other than subframes in the first subframe pool that may be indicated through the above-mentioned first UL grant and/or the first PHICH. In this case, the above-mentioned aggregation of the remaining subframes may be referred to the second pool. In this case, the reception of the above second UL grant and/or the second PHICH may be performed according to the abovementioned reference points S1220.

The base station, based on the first UL grant and/or first PHICH, receives the first PUSCH that is corresponding to the first subframe pool in the second serving cell from a UE (S1330). In this case, the base station may adjust the transmission timing of the above-mentioned first PUSCH of the UE based on the TDD UL/DL #0. That is, considering the UL reference UL/DL configuration as #0, it may adjust the transmission timing of the first PUSCH on the above-mentioned first subframe according to the abovementioned reference points in Table 8.

The base station receives the second PUSCH which is corresponding to the above-mentioned second serving cell based on the above-mentioned second UL grant and/or the second PHICH from a UE (S1340). In this case, the transmission timing of the above-mentioned second PUSCH of the UE, like existing timing of the HARQ operation based on the FDD, may be adjusted by the fourth subframe, after the above-mentioned second UL grant and/or the second PHICH are transmitted.

According to the case of above mentioned present invention, even when the TDD-FDD CA (or dual connectivity) is deployed, it may perform the effective UL scheduling/HARQ operation and improve the data transmission efficiency for performing the CA (or dual connectivity) to satisfy high data transmission rate to a UE.

Figure 14:
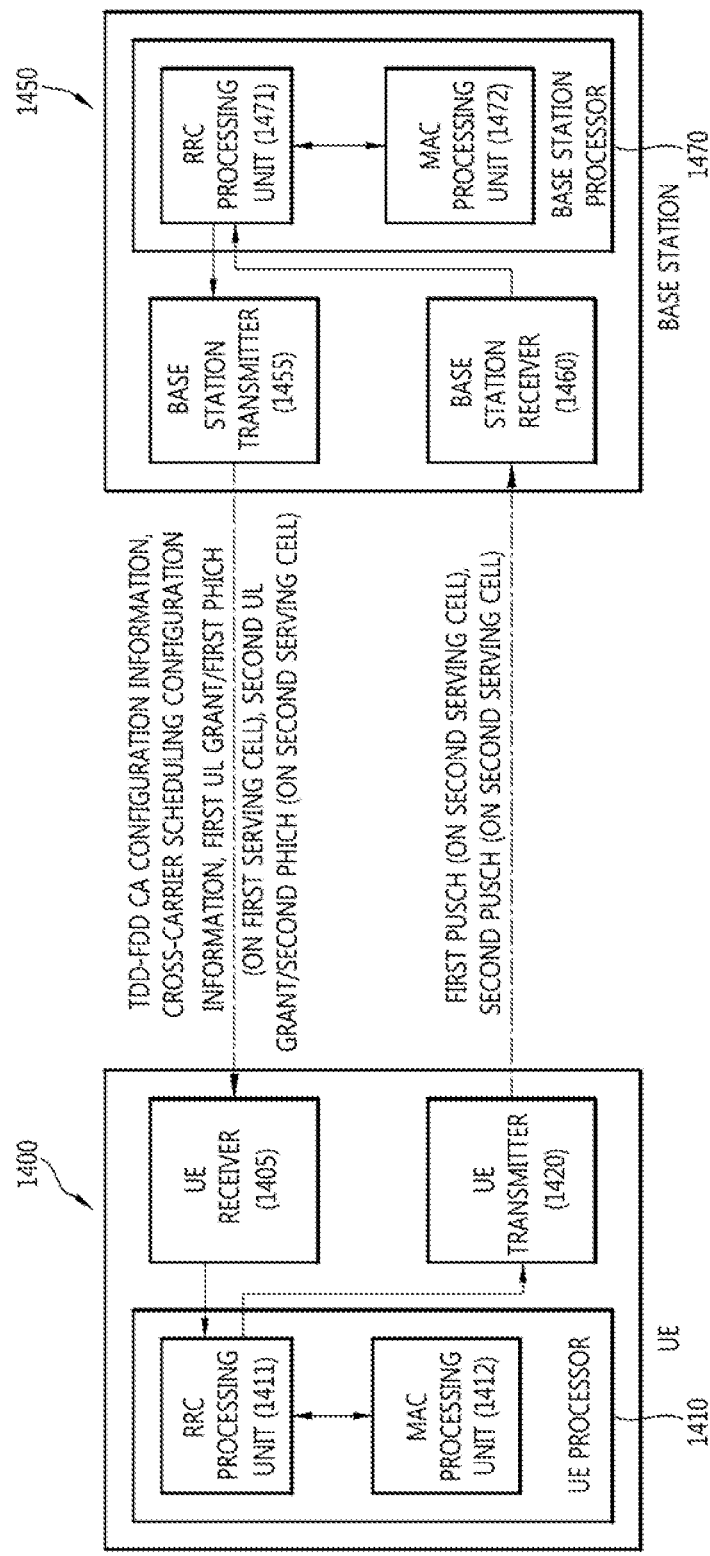
FIG. 14 is a block diagram illustrating an example of a base station and a UE performing the UL scheduling/HARQ operation as an exemplary embodiment of the present invention.

FIG. 14 is a block diagram illustrating the UE and the base station that performs UL scheduling/HARQ operation according to the present invention.

Referring to the FIG. 14, a UE 1400 includes the UE receiptor 1405, the UE processor 1410, and the UE transmitter 1420. The UE processor 1410 also includes the RRC processor 1411 and the MAC processor 1412.

The UE receiptor (1405) receives the CA configuration information of the first serving cell based on the TDD and the second serving cell based on the FDD, and configuration information (cross-carrier configuration information) that indicates the scheduling methods of the second serving cell in the first serving cell through the RRC signaling from the base station (1450).

The RRC processor 1411 analyses/interprets the above-mentioned RRC signaling and configures the cross-carrier scheduling and the CA of the first serving cell based on the above-mentioned TDD and the second serving cell based on the FDD to the UE.

The UE receiptor (1405) receives the first UL grant and/or the first PHICH associated with the above-mentioned the second serving cell through the cross-carrier scheduling regarding the first serving cell. In this case, the reception of the above-mentioned first UL grant and/or the first PHICH may be performed according to aforementioned reference points in S1210.

Further, the UE receiptor 1405 receives the second UL grant and/or the second PHICH associated with the second serving cell through a self scheduling associated with the second serving cell. The reception of the above-mentioned first UL grant and/or the first PHICH, and the first UL grant and/or the PHICH may be performed on one wireless frame.

The MAC processor 1412 adjusts the reception timing of the above-mentioned first UL grant and/or the first PHICH and the corresponding transmission timing of the first PUSCH. Further, the MAC processor 1412 adjusts the reception timing of the above-mentioned the second UL grant and/or the second PHICH and the corresponding the second PUSCH's transmission timing. In this case, the MAC processor 1412 may adjusts the transmission timing of the above-mentioned first PUSCH in the first subframe pool, according to the abovementioned reference points in Table 8. Also, the MAC processor 1412 may adjusts the timing of transmission of the second PUSCH in the second subframe pool which includes the remaining subframes except the subframes included in the above-mentioned first subframe pool.

The UE Transmitter 1420 transmits the first PUSCH to a base station 1450 at the first PUSCH transmission timing through the second serving cell. Also, the UE transmitter 1420 transmits the above-mentioned second PUSCH, at the above-mentioned second PUSCH transmission timing through the second serving cell.

The base station 1450 includes the transmitter of the base station 1455, the receptor of the base station 1460 and the processor of the base station 1470. The processor of base station 1470 also includes the RRC processor 1471 and the MAC processor 1472.

The RRC processor 1471 creates the cross-carrier scheduling configuration information and the CA configuration information of the first serving cell based on the TDD and the second serving cell based on the FDD. The RRC processor 1471 transmits the RCC signaling that includes the above-mentioned CA configuration information to the UE 1400 through the transmitter of base station 1455. The RRC processor 1471 transmits the RRC signaling including the above-mentioned cross-carrier scheduling information to the UE 1400 through the transmitter of base station 1455.

The MAC processor 1472 adjusts the transmission timing of the above-mentioned first UL grant and/or the first PHICH, and the corresponding reception timing of the first PUSCH. Also, the MAC processor 1472 adjusts the transmission timing of the above-mentioned second UL grant and/or the second PHICH, and the corresponding reception timing of the second PUSCH. In this case, the MAC processor 1472 may control the reception timing of the first PUSCH in the first subframe pool, according to the above-mentioned reference point in Table 8. Further, the MAC processor 1472 adjusts the reception timing of the second PUSCH, so that the above-mentioned second PUSCH receives in the second subframe pool which includes subframes other than those that are included in the above-mentioned first subframe pool.

The Receptor of base station 1460 receives the above-mentioned first PUSCH, at the reception timing of the above-mentioned first PUSCH, in the second serving cell from a UE (1400). Also, the receptor of the base station 1460 receives above-mentioned the second PUSCH in the second serving cell at the reception timing of the second PUSCH, in the second serving cell from a UE (1400).

The MAC processor 1472 performs the HARQ operation depending on successful reception of the above-mentioned first PUSCH and the second PUSCH to the receptor of the base station 1460.

Exemplary embodiments of the present invention may be implemented by hardware, software or a combination thereof. In a hardware configuration, the above-described functions and operations may be performed by one or more processors, such as a microprocessor, a controller, a microcontroller, or an ASIC (Application Specific Integrated Circuit), a DSP (Digital Signal Processor), a PLD (Programmable logic device), a FPGA (Field Programmable Gate Array), and/or combinations thereof configured to perform the functions and operations. In a software configuration, software or program codes to perform the functions and operations may be implemented as modules. Software may be stored in one or more memory units and may be executed by the one or more processors. It will be apparent to those of ordinary skill in the art from the description of the present invention to design, develop and implement the memory units or the processors.

While the present invention has been shown and described in connection with the embodiments, it will be apparent to those skilled in the art that modifications and variations can be made without departing from the spirit and scope of the invention as defined by the appended claims. Thus, the present invention is not limited to the foregoing embodiments and may include all the embodiments within the scope of the appended claims.

What is claimed is:

1. A User Equipment (UE) to transmit an uplink channel, the UE supporting a cross-carrier scheduling between a Frequency Division Duplex (FDD) cell and a Time Division Duplex (TDD) cell, the UE comprising:
   one or more processors; and
   memory storing instructions, when executed by the one or more processors, that cause the UE to:
   configure the TDD cell as a scheduled cell scheduled by the FDD cell; and
   when a TDD uplink/downlink configuration of the TDD cell is zero and the TDD cell is a scheduled cell scheduled by the FDD cell:
   receive an uplink (UL) grant via a subframe n of the FDD cell;
   transmit, via a subframe (n+k1) of the TDD cell, a Physical Uplink Shared Channel (PUSCH) associated with the UL grant, wherein k1 is determined to be 4 based on determining that n is 0 or 5, or k1 is determined to be 6 based on determining that n is 1 or 6; and
   receive, via a subframe i of the FDD cell, a Physical Hybrid Automatic Repeat reQuest Indicator Channel (PHICH), the PHICH being associated with a PUSCH transmitted via a subframe (i−k2) of the TDD cell, wherein k2 is determined to be 7 based on determining that (i−k2) is 3 or 8, or k2 is determined to be 4 based on determining that (i−k2) is 2 or 7,
   wherein the cross-carrier scheduling comprises at least one of a downlink cross-carrier scheduling and an uplink cross-carrier scheduling,
   wherein Physical Downlink Control Channel (PDCCH) and Physical Downlink Shared Channel (PDSCH) are transmitted through different downlink carriers in the downlink cross-carrier scheduling, and
   wherein a downlink carrier in which the PDCCH having a first UL grant is transmitted is different from a downlink carrier linked with an uplink carrier in which the PUSCH associated with the first UL grant is transmitted.

2. A User Equipment (UE) to transmit an uplink channel, the UE supporting a cross-carrier scheduling between a Frequency Division Duplex (FDD) cell and a Time Division Duplex (TDD) cell, the UE comprising:
   one or more processors; and
   memory storing instructions, when executed by the one or more processors, that cause the UE to:
   receive, from a base station, cross-carrier scheduling information;
   determine a TDD uplink/downlink configuration of the TDD cell;
   configure, based on the cross-carrier scheduling information, the TDD cell as a scheduled cell scheduled by the FDD cell; and
   when the TDD cell is a scheduled cell scheduled by the FDD cell:
   receive an uplink (UL) grant via a subframe n of the FDD cell;
   determine, based on the TDD uplink/downlink configuration of the TDD cell and based on the number n, an interval k1 between the UL grant and a Physical Uplink Shared Channel (PUSCH) associated with the UL grant;
   transmit, via a subframe (n+k1) of the TDD cell, a Physical Uplink Shared Channel (PUSCH) associated with the UL grant, wherein k1 is determined to be 4 based on determining that n is 4 or 9, or k1 is determined to be 6 based on determining that n is 1 or 6;
   determine, based on the TDD uplink/downlink configuration of the TDD cell and based on the number (n+k1), an interval k2 between the PUSCH and a Physical Hybrid Automatic Repeat reQuest Indicator Channel (PHICH) associated with the PUSCH; and
   during a subframe (n+k1+k2) of the FDD cell, monitoring for a Physical Hybrid Automatic Repeat reQuest Indicator Channel (PHICH) transmitted via the FDD cell,
   wherein the cross-carrier scheduling comprises at least one of a downlink cross-carrier scheduling and an uplink cross-carrier scheduling,
   wherein Physical Downlink Control Channel (PDCCH) and Physical Downlink Shared Channel (PDSCH) are transmitted through different downlink carriers in the downlink cross-carrier scheduling, and
   wherein a downlink carrier in which the PDCCH having a first UL grant is transmitted is different from a downlink carrier linked with an uplink carrier in which the PUSCH associated with the first UL grant is transmitted.

3. The UE of claim 2, wherein when the TDD uplink/downlink configuration of the TDD cell is one and the TDD cell is a scheduled cell scheduled by the FDD cell:
   k1 is determined to be 4 based on determining that n is 4 or 9, or k1 is determined to be 6 based on determining that n is 1 or 6; and
   k2 is determined to be 6 based on determining that (n+k1) is 3 or 8, or k2 is determined to be 4 based on determining that (n+k1) is 2 or 7.

4. The UE of claim 2, wherein when the TDD uplink/downlink configuration of the TDD cell is two and the TDD cell is a scheduled cell scheduled by the FDD cell:
   k1 is determined to be 4 based on determining that n is 3 or 8; and
   k2 is determined to be 6 based on determining that (n+k1) is 2 or 7.

5. The UE of claim 2, wherein when the TDD uplink/downlink configuration of the TDD cell is three and the TDD cell is a scheduled cell scheduled by the FDD cell:
   k1 is determined to be 4 based on determining that n is 0, 8, or 9; and
   k2 is determined to be 6 based on determining that (n+k1) is 2, 3, or 4.

6. The UE of claim 2, wherein when the TDD uplink/downlink configuration of the TDD cell is four and the TDD cell is a scheduled cell scheduled by the FDD cell:
   k1 is determined to be 4 based on determining that n is 8 or 9; and
   k2 is determined to be 6 based on determining that (n+k1) is 2 or 3.

7. The UE of claim 2, wherein when the TDD uplink/downlink configuration of the TDD cell is five and the TDD cell is a scheduled cell scheduled by the FDD cell:
   k1 is determined to be 4 based on determining that n is 8; and
   k2 is determined to be 6 based on determining that (n+k1) is 2.

8. The UE of claim 2, wherein when the TDD uplink/downlink configuration of the TDD cell is six and the TDD cell is a scheduled cell scheduled by the FDD cell:
- k1 is determined to be 7 based on determining that n is 0, 1, 5, or 6, or k1 is determined to be 5 based on determining that n is 9; and
- k2 is determined to be 6 based on determining that (n+k1) is 3 or 4, k2 is determined to be 4 based on determining that (n+k1) is 2 or 7, or k2 is determined to be 7 based on determining that (n+k1) is 8.

9. A base station to receive an uplink channel transmitted from a User Equipment (UE), the UE supporting a cross-carrier scheduling between a Frequency Division Duplex (FDD) cell and a Time Division Duplex (TDD) cell, the base station comprising:
- one or more processors; and
- memory storing instructions, when executed by the one or more processors, that cause the base station to:
- configure, for the UE, a TDD uplink/downlink configuration of the TDD cell to be zero;
- configure, for the UE, the TDD cell as a scheduled cell scheduled by the FDD cell; and
- when the TDD uplink/downlink configuration of the TDD cell is zero and the TDD cell is a scheduled cell scheduled by the FDD cell:
- transmit an uplink (UL) grant via a subframe n of the FDD cell;
- receive, from the UE and via a subframe (n+k1) of the TDD cell, a Physical Uplink Shared Channel (PUSCH) associated with the UL grant, wherein k1 is determined to be 4 based on determining that n is 0 or 5, or k1 is determined to be 6 based on determining that n is 1 or 6; and
- transmit, via a subframe i of the FDD cell, a Physical Hybrid Automatic Repeat reQuest Indicator Channel (PHICH), the PHICH being associated with a PUSCH transmitted via a subframe (i−k2) of the TDD cell, wherein k2 is determined to be 7 based on determining that (i−k2) is 3 or 8, or k2 is determined to be 4 based on determining that (i−k2) is 2 or 7,
- wherein the cross-carrier scheduling comprises at least one of a downlink cross-carrier scheduling and an uplink cross-carrier scheduling,
- wherein Physical Downlink Control Channel (PDCCH) and Physical Downlink Shared Channel (PDSCH) are transmitted through different downlink carriers in the downlink cross-carrier scheduling, and
- wherein a downlink carrier in which the PDCCH having a first UL grant is transmitted is different from a downlink carrier linked with an uplink carrier in which the PUSCH associated with the first UL grant is transmitted.

10. A base station to receive an uplink channel transmitted from a User Equipment (UE), the UE supporting a cross-carrier scheduling between a Frequency Division Duplex (FDD) cell and a Time Division Duplex (TDD) cell, the base station comprising:
- one or more processors; and
- memory storing instructions, when executed by the one or more processors, that cause the base station to:
- determine, for the UE, a TDD uplink/downlink configuration of the TDD cell;
- configure the TDD cell as a scheduled cell scheduled by the FDD cell;
- transmit, to the UE, cross-carrier scheduling information; and
- when the TDD cell is a scheduled cell scheduled by the FDD cell:
- transmit, to the UE, an uplink (UL) grant via a subframe n of the FDD cell;
- determine, based on the TDD uplink/downlink configuration of the TDD cell and based on the number n, an interval k1 between the UL grant and a Physical Uplink Shared Channel (PUSCH) associated with the UL grant;
- during a subframe (n+k1) of the TDD cell, monitoring for a Physical Uplink Shared Channel (PUSCH) associated with the UL grant and transmitted via the TDD cell, wherein k1 is determined to be 4 based on determining that n is 4 or 9, or k1 is determined to be 6 based on determining that n is 1 or 6;
- determine, based on the TDD uplink/downlink configuration of the TDD cell and based on the number (n+k1), an interval k2 between the PUSCH and a Physical Hybrid Automatic Repeat reQuest Indicator Channel (PHICH) associated with the PUSCH; and
- during a subframe (n+k1+k2) of the FDD cell, transmit a Physical Hybrid Automatic Repeat reQuest Indicator Channel (PHICH) via the FDD cell,
- wherein the cross-carrier scheduling comprises at least one of a downlink cross-carrier scheduling and an uplink cross-carrier scheduling,
- wherein Physical Downlink Control Channel (PDCCH) and Physical Downlink Shared Channel (PDSCH) are transmitted through different downlink carriers in the downlink cross-carrier scheduling, and
- wherein a downlink carrier in which the PDCCH having a first UL grant is transmitted is different from a downlink carrier linked with an uplink carrier in which the PUSCH associated with the first UL grant is transmitted.

11. The base station of claim 10, wherein when the TDD uplink/downlink configuration of the TDD cell is one and the TDD cell is a scheduled cell scheduled by the FDD cell:
- k1 is determined to be 4 based on determining that n is 4 or 9, or k1 is determined to be 6 based on determining that n is 1 or 6; and
- k2 is determined to be 6 based on determining that (n+k1) is 3 or 8, or k2 is determined to be 4 based on determining that (n+k1) is 2 or 7.

12. The base station of claim 10, wherein when the TDD uplink/downlink configuration of the TDD cell is two and the TDD cell is a scheduled cell scheduled by the FDD cell:
- k1 is determined to be 4 based on determining that n is 3 or 8; and
- k2 is determined to be 6 based on determining that (n+k1) is 2 or 7.

13. The base station of claim 10, wherein when the TDD uplink/downlink configuration of the TDD cell is three and the TDD cell is a scheduled cell scheduled by the FDD cell:
- k1 is determined to be 4 based on determining that n is 0, 8, or 9; and
- k2 is determined to be 6 based on determining that (n+k1) is 2, 3, or 4.

14. The base station of claim 10, wherein when the TDD uplink/downlink configuration of the TDD cell is four and the TDD cell is a scheduled cell scheduled by the FDD cell:
- k1 is determined to be 4 based on determining that n is 8 or 9; and
- k2 is determined to be 6 based on determining that (n+k1) is 2 or 3.

15. The base station of claim 10, wherein when the TDD uplink/downlink configuration of the TDD cell is five and the TDD cell is a scheduled cell scheduled by the FDD cell:
- k1 is determined to be 4 based on determining that n is 8; and
- k2 is determined to be 6 based on determining that (n+k1) is 2.

16. The base station of claim 10, wherein when the TDD uplink/downlink configuration of the TDD cell is six and the TDD cell is a scheduled cell scheduled by the FDD cell:
- k1 is determined to be 7 based on determining that n is 0, 1, 5, or 6, or k1 is determined to be 5 based on determining that n is 9; and
- k2 is determined to be 6 based on determining that (n+k1) is 3 or 4, k2 is determined to be 4 based on determining that (n+k1) is 2 or 7, or k2 is determined to be 7 based on determining that (n+k1) is 8.

* * * * *